(12) United States Patent
Scardina et al.

(10) Patent No.: US 11,656,178 B2
(45) Date of Patent: *May 23, 2023

(54) UV-VIS SPECTROSCOPY INSTRUMENT AND METHODS FOR COLOR APPEARANCE AND DIFFERENCE MEASUREMENT

(71) Applicant: Hunter Associates Laboratory, Inc., Reston, VA (US)

(72) Inventors: Michael T. Scardina, Woodbridge, VA (US); Tod L. Kerr, Reston, VA (US); Matthew T. Falanga, Washington, DC (US); Miguel A. Marcos, Falls Church, VA (US)

(73) Assignee: Hunter Associates Laboratory, Inc., Reston, VA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/203,113

(22) Filed: Mar. 16, 2021

(65) Prior Publication Data

US 2021/0208069 A1    Jul. 8, 2021

Related U.S. Application Data

(63) Continuation of application No. 16/378,620, filed on Apr. 9, 2019, now Pat. No. 11,002,676.

(60) Provisional application No. 62/654,831, filed on Apr. 9, 2018.

(51) Int. Cl.
| | |
|---|---|
| *G01N 21/57* | (2006.01) |
| *G01N 21/55* | (2014.01) |
| *G01N 21/33* | (2006.01) |
| *G01N 21/47* | (2006.01) |

(52) U.S. Cl.
CPC ............ *G01N 21/57* (2013.01); *G01N 21/33* (2013.01); *G01N 21/55* (2013.01); *G01N 2021/4757* (2013.01); *G01N 2021/555* (2013.01)

(58) Field of Classification Search
CPC combination set(s) only.
See application file for complete search history.

(56) References Cited

U.S. PATENT DOCUMENTS

| | | | |
|---|---|---|---|
| 5,636,015 A | 6/1997 | Imura et al. | |
| 5,706,083 A | 1/1998 | Iida et al. | |
| 6,362,849 B1 | 3/2002 | Caisey-Bluteau et al. | |
| 6,583,879 B1 | 6/2003 | Berg et al. | |
| 7,230,707 B2 | 6/2007 | Ingleson et al. | |
| 7,437,000 B1 | 10/2008 | Rosenthal et al. | |
| 7,489,396 B1 | 2/2009 | Vrhel et al. | |
| 7,773,215 B2 | 8/2010 | Lee et al. | |
| 8,064,057 B2 | 11/2011 | Styles et al. | |
| 8,139,220 B2 | 3/2012 | Peterson et al. | |
| 8,288,739 B2 | 10/2012 | Imura | |
| 8,532,371 B2 | 9/2013 | Agarwal et al. | |

(Continued)

FOREIGN PATENT DOCUMENTS

KR    20050077695    8/2005

OTHER PUBLICATIONS

M.D. Fairchild and G.M. Johnson, "The iCAM framework for image appearance, image differences, and image quality," Journal of Electronic Imaging, 13 126-138 (2004).

*Primary Examiner* — Hina F Ayub
(74) *Attorney, Agent, or Firm* — WC&F IP

(57) ABSTRACT

Embodiments of the invention generally relate to color and appearance metric measurements and, in particular, developing instrumentation to enable self-consistent image appearance measurements within instruments of unitary construction.

25 Claims, 23 Drawing Sheets

(56) References Cited

U.S. PATENT DOCUMENTS

| | | |
|---|---|---|
| 9,417,132 B2 | 8/2016 | Xin et al. |
| 9,677,942 B2 | 6/2017 | Steenhoek |
| 2002/0018203 A1 | 2/2002 | Battle et al. |
| 2005/0018191 A1 | 1/2005 | Luo et al. |

UV-VIS SPECTROSCOPY INSTRUMENT AND METHODS FOR COLOR APPEARANCE AND DIFFERENCE MEASUREMENT

CROSS-REFERENCE TO RELATED APPLICATIONS

This patent application or patent claims the benefit of U.S. Provisional Patent Application No. 62/654,831, filed Apr. 9, 2018, the complete contents of which are herein incorporated by reference. In the event of conflicting information between the incorporated content and content explicitly provided herein, the latter controls.

FIELD OF THE INVENTION

Embodiments of the invention generally relate to psychophysical measurements and, in particular, spectroscopy instruments and methods for characterizing the appearance of samples in a self-consistent way.

BACKGROUND

Three elements are involved in seeing or perceiving color: a light source, an object, and an observer. A framework of describing human color perception according to these three elements is sometimes referred to as the visual observing situation. To build an instrument that quantifies human color perception, each item in the visual observing situation may be characterized.

The first element of the visual observing situation is a light source. A light source is a physical source of light. The visible portion of the electromagnetic spectrum is defined by the International Commission on Illumination (CIE) as 360 to 780 nm. A plot of the relative energy at each wavelength creates a spectral power distribution (SPD) curve that quantifies the characteristics of the light source. A CIE illuminant is a standard table of numbers representing relative energy versus wavelength for the spectral characteristics of light sources. Some common illuminants and their CIE abbreviations are as follows: Incandescent (A), Average Daylight (C), Noon Daylight ($D_{65}$), and Cool White Fluorescent (F2). By representing a light source as an illuminant, the spectral characteristics of the first element of the visual observing situation is quantified and standardized.

The second element of the visual observing situation is an object. Objects modify light. Colorants such as pigments or dyes that are in or on the object selectively absorb some wavelengths of incident light while reflecting or transmitting other wavelengths. The amount of light that is reflected, absorbed, or transmitted by the object at each wavelength can be quantified. This can be represented as a spectral curve. By measuring the relative reflectance or transmission characteristics of an object, the second element of the visual observing situation becomes quantified. Relative reflectance, or reflectance factor, is defined as the relative amount of energy measured on an arbitrary sample at a fixed geometry, in reflection, with respect to a known white sample similarly used to define the top-of-scale of the measurement. This is important to distinguish as reflectivity is also a function of angle and total reflectance would require a hemisphere to collect all angles. A device which measures relative reflectance or transmittance as a function of wavelength is typically a spectrophotometer.

The third element of the visual observing situation is the observer, which is often but not necessarily a human. A human eye has structures referred to as rods and cones. Cones are responsible for color vision and have three types of sensitivity: red, green, and blue. The CIE experimentally measured the ability of the human eye to perceive color. The experimentally derived x-bar, y-bar, and z-bar color matching functions became the CIE 1931 2° Standard Observer. The functions x-bar, y-bar, and z-bar quantify the red, green, and blue cone sensitivity of an average human observer. An updated standard was later produced and is referred to as the 1964 10° Standard Observer. This is the standard recommended for use today by the CIE.

In science and industry, the trifecta of light source, object, and observer becomes the trifecta of light source, sample, and detector. The CIE X, Y, and Z tristimulus color values are obtained by multiplying the illuminant, the reflectance or transmittance of the object, and the standard observer functions. The product is then summed for all wavelengths in the visible spectrum to give the resulting X, Y, Z tristimulus values.

A colorimetric spectrophotometer may comprise a light source, a diffraction grating, a diode array, and a processor. The instrument may be configured to produce CIE X, Y, Z color values for a sample. Briefly, the light source illuminates the sample being measured. Light reflected by the objects is passed to a diffraction grating which breaks it into its spectral components. Much of the diffracted light falls onto the diode array which senses the amount of light at each wavelength. The spectral data is sent to the processor where it is multiplied with a user-selected illuminant and observer tables to obtain CIE X, Y, Z color values.

The CIE X, Y, Z value system is a color scale. When describing color, the CIE X, Y, Z values are not easily understood (they are not intuitive). Other color scales have been developed to better relate to how humans perceive color, simplify understanding of the metrics, improve communication of color, and better represent uniform color differences. All colors can be organized in three dimensions: lightness, chroma or saturation, and hue. Hunter L,a,b color space is a 3-dimensional rectangular color based on Opponent-Colors Theory with the following dimensions:

L (lightness) axis: 0 is black, 100 is white, and 50 is middle gray a (red-green) axis: positive values are red, negative values are green, and 0 is neutral b (blue-yellow) axis: positive values are yellow, negative values are blue, and 0 is neutral The opponent-colors have been explained physiologically by the organization of cone cells into what are called receptive fields in the fovea of the human eye. A receptive field provides a number of inputs from the cone cells (both positive and negative) that can interface with ganglion cells to produce spatial edge-detection for red-green and blue-yellow stimuli. The spectral distribution for these receptive fields correlates well with a, b.

There are two popular L,a,b color scales in use today: Hunter L,a,b and CIE L*,a*,b*. While similar in organization, a color will have different numerical values in these two color spaces. Both Hunter L,a,b and CIE L*,a*,b* scales are mathematically derived from CIE X,Y,Z values. Scales of chroma and hue are also functions of a* and b*; where chroma is the scalar magnitude, $((a^*)^2+(b^*)^2)^{1/2}$, and hue angle is represented by the arc tangent of (b*/a*).

Color measurement is employed in industry and in education according to color differences. Color differences are calculated as sample-standard values. According to the CIE L*,a*,b* color scale, If delta L* is positive, the sample is lighter than the standard. If delta L* is negative, the sample is darker than the standard.

If delta a* is positive, the sample is more red (or less green) than the standard. If delta a* is negative, the sample is more green (or less red) than the standard.

If delta b* is positive, the sample is more yellow (or less blue) than the standard. If delta b* is negative, the sample is more blue (or less yellow) than the standard.

Total color difference (delta E*, or ΔE*) is based on the L*,a*,b* color differences and was designed to be single number metric for PASS/FAIL decisions in industry. Delta E* is determined as the square root of the sum of the squares of L*, a*, and b*:

$$(\Delta E^* = \sqrt{(\Delta L^*)^2 + (\Delta a^*)^2 + (\Delta b^*)^2}$$

Thus far color of an object or sample has been generally ascribed to pigments or dyes of uniform extent. The use cases when applying delta E* are limited to comparing samples that do not have complicated surroundings and are observed under identical viewing conditions. Other qualities of an object also play a role in color, further complicating its measurement and characterization. Surface characteristics and geometry play an important role in color.

Surface characteristics such as high frequency spatial patterns can modulate perceived color. To accurately measure delta E*, the spatial characteristics of the human observer must be further modeled. This includes the spatial frequency response of contrast sensitivity functions (CSFs) modeling the eye physiology. Each CSF may be thought of as a convolution or low-pass filter (in the frequency domain) when observed with different sizes of receptive field; of which large receptive field apertures transfer low spatial frequency stimuli. As a result, there is a spatial-color sensitivity of the human eye, according to red-green, and blue-yellow dimensions. In general, as the spatial frequency of the stimulus increases (narrower spacing), color differences become erroneous, especially differences along the blue-yellow axis. Since the opponent-color spaces like L*, a*, b* are differentiable, there exists a direct correlation to the spatial receptive field and convolutions of the L*, a*, b* axes.

Another surface characteristic of samples is reflectance. For opaque materials, most of the incident light is reflected or absorbed. For translucent materials, most of the incident light is transmitted. Reflectance make take either of two forms. Diffuse reflection involves non-directional reflected light. This light is scattered in many directions. Specular reflection is reflection of light by which the angle of reflection matches the angle of incidence of the incident light striking the surface of the object.

For fluorescent materials, another surface characteristic is the light emitted by the material as a function of the illuminating source. Fluorescent whitening agents (FWAs), for example, are molecules that absorb light in the ultraviolet and violet wavelengths of the electromagnetic spectrum and re-emit light in blue wavelengths. The addition of both reflectance and fluorescence components can greatly exceed the reference white point. UV adjustments for calibrating whiteness instruments to materials was developed Ganz and Griesser. The UV control system was further refined by Imura et al. (U.S. Pat. No. 5,636,015), who extended the method to include the multiple excitation of LEDs in (U.S. Pat. No. 8,288,739).

Color is seen in the diffuse reflection, and gloss is seen in the specular reflection. The reflection at the specular angle is generally the greatest amount of light reflected at any single angle. From air-to-glass at low angles of incidence, specular reflection represents less than 4% of total incident light. For a 60° angle (as in gloss geometry), the reflection of polished glass is ~10%. The remaining light is transmitted or absorbed with almost no diffuse reflection.

Richard Sewall Hunter, a pioneer in color and appearance, identified six visual criteria for defining a gloss scale. These are specular gloss, contrast gloss, distinctness-of-image (DOI) gloss, absence-of-bloom gloss, sheen, and surface-uniformity gloss. In the color industry, "instrumental gloss" is the most common form of gloss measurement and correlates with Hunter's specular gloss criteria. The ratio of diffuse reflection (45° to the angle of incidence) to specular reflection (equal to the angle of incidence) if subtracted from unity is a measure of contrast gloss. An exemplary geometry for measuring instrumental gloss on most samples is 60° (i.e., 60/60, defined with respect to the surface normal of the sample). Another geometry (30/30) has combined multiple field angles with a diode array to quantify reflection haze and distinctness of reflected image (DORI).

Surface texture of samples can greatly affect perceived color. Samples which have exactly the same color to a spectrophotometer, but which have different surface textures, will appear to have different colors to a human observer. Surfaces may generally be described as glossy or matte. Glossy surfaces appear darker or more saturated. Matte surfaces appear lighter and less saturated. Increased surface roughness affects perceived color such that it appears lighter and less saturated. This is caused by mixing diffuse reflectance (where humans see pigment color) with increased scatter from specular reflectance (white). The rougher the surface, the greater the scatter of the specular reflectance.

Instrument geometry defines the arrangement of light source, sample plane, and detector. There are two general categories of instrument geometries: Bi-directional (45°/0° or 0°/45°) and diffuse (d/8° sphere). Bi-Directional 45°/0° geometry has illumination at a 45° angle and measurement at 0°. The reciprocal, 0°/45° geometry, has illumination at 0° and measurement at 45°. Both directional geometries by definition exclude the specular reflection in the measurement. This is sometimes indicated in numerical tables by the phrase, "specular excluded". Bi-Directional geometry measurements provide measurements that may correspond to visual changes in sample appearance due to changes in either pigment color or surface texture. To reduce the directionality of an arbitrary sample, the 45° illumination or detection may be revolved circumferentially around the sample in at least 12 equally spaced locations (designated as 45c) or ring-shaped beams may be formed using axicon lenses or free-form optics (45a).

Diffuse (sphere) geometry instruments use a white coated sphere to diffusely illuminate a sample with 8° (d/8°) viewing. Measurements on a diffuse sphere instrument can be taken with the specular included or specular excluded. Specular included measurements negate surface differences and provide values which correspond to changes in actual color (as opposed to perceived color). Specular excluded measurements negate specular reflectance on very smooth surfaces, measuring only diffuse reflectance. For illustration, as between two surfaces painted with the same red paint, one surface having a matte finish and the other surface having a high gloss finish, the specular included measurement indicates no color difference. It quantifies only colorant differences and negates differences in surface finishes. In the specular excluded mode, the readings quantify appearance differences, similar to those from the direction (0°/45°)

geometry instrument. Most diffuse geometry measurements are taken in the specular included mode.

Glossmeters, spectrophotometers, and other imaging devices employed in optics are traditionally independent instruments. These devices may be specially tailored to detect and characterize very specific qualities of light while ignoring other qualities of light. Yet, gloss, reflectance, measured color, perceived color, and texture are all interrelated. When these attributes are characterized separately (e.g., by independent laboratory instruments like independent glossmeters and independent spectrophotometers), variations in environmental conditions or device-dependent parameters inevitably result in inconsistencies among the characterizations of the individual attributes. Indeed, the independent measurements may conflict over the actual appearance of a sample.

The "Spectromatch Gloss Spectrophotometer", available from Sheen Instruments, is one example attempt in the industry to combine color and gloss measurements in one unit. Devices such as this still fail to provide "constant" color difference of a sample, if paired with an external imaging system, because the appearance of surface features depends on the luminance distribution of the illumination scene. The two instruments exist separately, and information cannot be easily correlated together to calibrate consistent results.

SUMMARY

According to one aspect, a single optical instrument (in particular, a spectroscopy instrument) with well-defined geometry and apertures is configured for measuring instrumental gloss, relative reflectance, and two-dimensional color appearance images in a self-consistent way.

Subsystems responsive for relative reflectance measurement and imaging may share reciprocal 45/0 and 0/45 geometries of the same sample aperture (e.g., multiple apertures from 0.1"-2.0" in diameter). A motorized rotation stage permits an interchange between illumination and measurement axes. That is, in the reciprocal design, illumination at 0° can be interchanged with the imaging system at 0° via the motorized rotation stage. In both cases, the reciprocal cone angles may be identical as well as the illumination-detection spectral power distributions (SPDs). Self-consistency may mean equating multiple viewing parameters (such as measurement geometry and SPD) between two or more subsystems, in order to reduce the optimization solution space of color appearance and difference and more easily facilitate accurate color reproduction.

According to an exemplary embodiment, a spectroscopy instrument comprises, in a unitary construction, a gloss-measuring subsystem configured to measure instrumental gloss; a reflectance-measuring subsystem configured to measure relative reflectance of multiple sample apertures; and an imaging subsystem configured to capture one or more color appearance images and segment the image into multiple regions of interest.

An exemplary spectroscopy instrument may further comprise a controller (which may be or include a closed loop control system) configured to self-consistently optimize an image color appearance model (iCAM) dependent on one or more area-averaged color measurement apertures from measurements of the gloss-measuring subsystem, reflectance-measuring subsystem, and imaging subsystem. Self-consistent may mean components of the iCAM present non-conflicting characterizations of object or sample appearance. The method significantly constrains the chromatic adaptation transform (CAT) equations in image color appearance models (iCAMs).

An exemplary spectroscopy instrument may further comprise a sample aperture shared by the gloss-measuring subsystem, the reflectance-measuring subsystem, and the imaging subsystem. The reflectance-measuring subsystem and imaging system may share reciprocal 45/0 and 0/45 geometries of the sample aperture. An illumination axis of the reflectance-measuring subsystem may be coaxial with a measurement axis of the imaging subsystem. The sample aperture may be variable from 0.1" to 2" through a combination of a variable field-stop for illumination and a variable port plate for collection. Ø0.1" is the aperture diameter of the CIE 1931 2° stimulus, and Ø2" represents the background aperture diameter for CIE 1964 10° stimulus.

An exemplary spectroscopy instrument may further comprise a controller for controlling activation of the subsystems, one or more ultraviolet (UV) light sources of one or more of the subsystems, and one or more sample presence sensors for detecting the presence or absence of a sample, wherein the controller is configured to permit activation of the one or more UV light sources only when the presence of a sample is detected by the one or more sample presence sensors.

An exemplary spectroscopy instrument may further comprise a ring assembly that comprises separate fiber-optic arrays of the reflectance subsystem and the imaging subsystem.

An exemplary gloss-measuring subsystem may comprise an emitter block and a receiver block with 20/20, 60/60, 85/85 or 30/30 geometry.

An exemplary gloss-measuring subsystem may be ASTM D523 compliant.

An exemplary reflectance-measuring subsystem may comprise an illumination assembly (shared with the imaging subsystem), a fiber-optic detection array, and a spectrometer. The illumination assembly may comprise an LED array and a color mixing light pipe for homogenizing different outputs of different LEDs of the LED array. The LED array may comprise electroluminescent narrow-band full width half maximum (FWHM) LEDs, or electroluminescent LEDs and laser diodes combined with broadband photoluminescent YAG phosphors or quantum dots. Advantageously, using the same LED array in two subsystems (reflectance and imaging) achieves self-consistent viewing conditions. The combined SPD of the LED array may be finely tuned using pulse width modulation to compensate for differences in the detector spectral response of the subsystems.

An exemplary spectroscopy instrument may further comprise a controller for controlling activation of the subsystems, wherein the controller has discrete control over each LED of the LED array and permits measurement characterization of a fluorescing sample emission as a function of its excitation.

An exemplary reflectance-measuring subsystem may further comprise a plurality of lens groups. The exemplary reflectance-measuring subsystem may further comprise a motorized stage for changing which of the plurality of lens groups is aligned with a 0° axis of the reflectance-measuring subsystem.

An exemplary imaging subsystem may comprise an imaging device affixed to the motorized stage, the motorized stage being movable to bring the imaging system into and out of alignment with the 0° axis. The exemplary imaging subsystem further comprises equally-spaced circumferential illumination, wherein the imaging system has a 45c/0 geometry utilizing a secondary fiber-optic array of the ring assembly coupled to the illumination assembly, when the imaging system is in alignment with the 0° axis.

An exemplary reflectance-measuring subsystem may be CIE 15:2004 and ASTM E1164 compliant. An exemplary imaging subsystem may be ISO 17321 compliant. To fully comply with ASTM E1164, collimating optics are needed to reduce the cone angles to +/−2° about the 45° axis.

An exemplary spectroscopy instrument may comprise a controller configured to self-consistently optimize color spaces and color differences from measurements as a function of the aperture size from measurements of the gloss-measuring subsystem, reflectance-measuring subsystem, and imaging subsystem, wherein the controller is configured to process an image from the imaging subsystem in dependence on the reflectance and gloss measurements, and outputs a self-consistent image appearance and color difference metrics as a function of aperture size at an output terminal. The output terminal may be a user interface shared by the gloss-measuring subsystem, the reflectance measuring subsystem, and the imaging subsystem.

An exemplary spectroscopy instrument may comprise a controller configured to optimize an image appearance and color difference model of the gloss-measuring subsystem, reflectance-measuring subsystem, and imaging subsystem self-consistently; wherein the controller is configured for initial mapping of information from the relative reflectance to the visual field at multiple area-averaged measurement apertures of increasing size about a stimulus, and multiple viewing conditions are made equal to constrain the total amount of colorimetric shift between subsystems. The controller is configured for initial mapping of the relative reflectance to RAW pixels values of the image sensor, then separates the spatial characteristics of the two-dimensional imagery within a local color difference metric, characterizing spatial content in terms of gradients of the color difference metrics, and measuring the influence of gloss on object appearance.

An exemplary spectroscopy instrument may comprise a controller that, after each measurement, is configured to determine whether the measurement and any preceding cycles of the same measurement satisfy a predetermined minimum statistical certainty, direct the subsystem to repeat the measurement if the predetermined minimum statistical certainty is not satisfied, and conclude measurement with the subsystem if the predetermined minimum statistical certain is satisfied. When the determining step finds the predetermined minimum statistical certainty is not met by the measurement, the controller is may adjust one or more measurement parameters prior to repeating the measurement.

An exemplary method of producing color and appearance measurements for a sample comprises measuring relative reflectance of the sample; measuring instrumental gloss of the sample; capturing an image of the sample; and outputting self-consistent color appearance and difference based on the measured relative reflectance of multiple apertures, the measured instrumental gloss, and the captured image.

DETAILED DESCRIPTION

Figure 1:
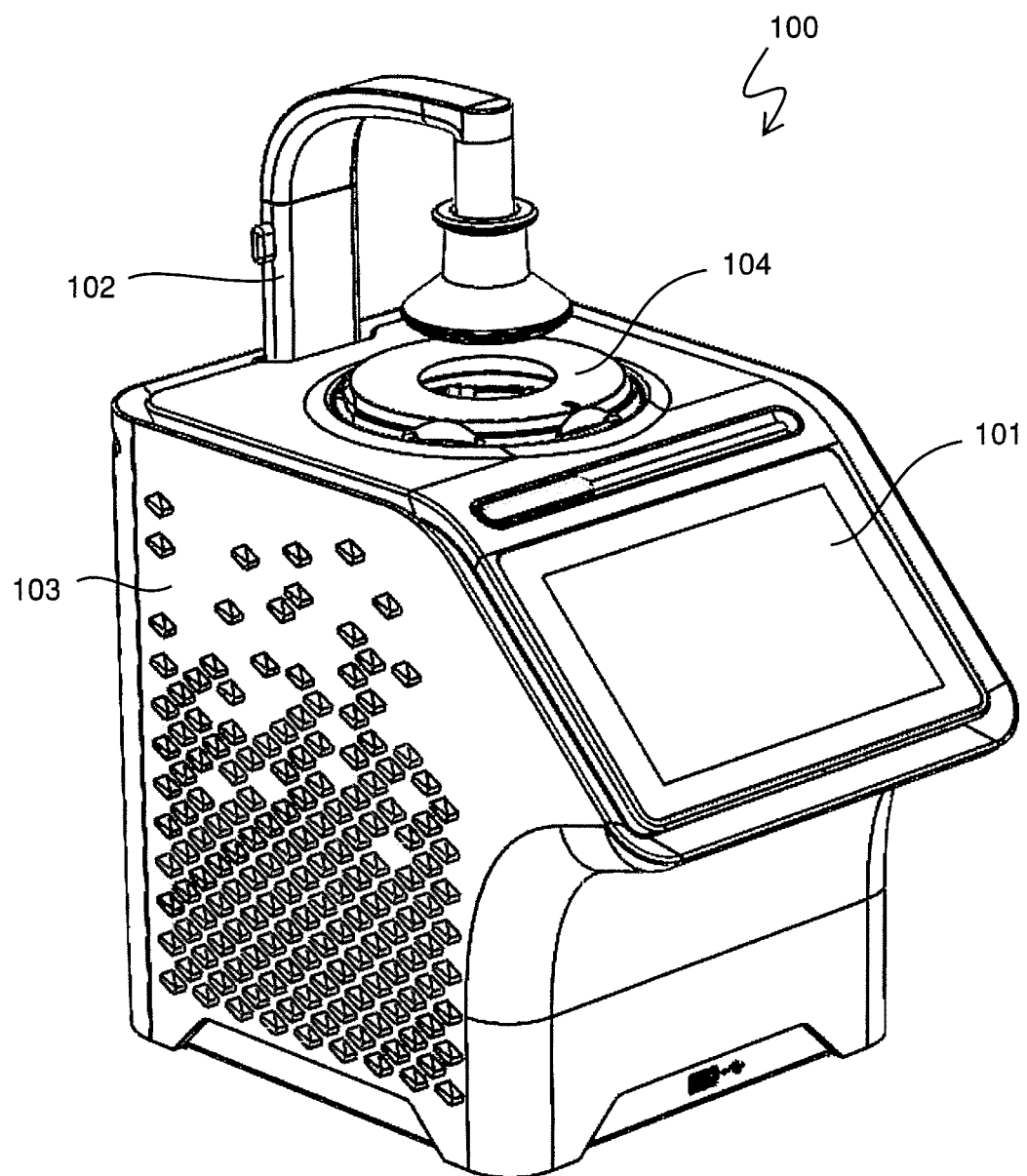
FIG. 1 is an exemplary spectroscopy instrument that includes a gloss-measuring subsystem, a reflectance-measuring subsystem, and an imaging subsystem in a unitary construction.

The figures show different views of an exemplary instrument 100 or parts thereof. FIG. 1 shows instrument 100 in its entirety as viewed from an exterior. At its exterior, instrument 100 includes, for example, a user interface 101 and sample clamp 102. As the disclosure progresses to subsequent figures, parts of the instrument 100 are selectively removed from view to permit viewing of further parts which are otherwise obscured. For instance, as compared to FIG. 1, FIGS. 2A and 2B do not show the housing 103, sample clamp 102, or user interface 101, thereby permitting a view of elements ordinarily enclosed by the housing 103 in a state of use. It should be appreciated that in the practice of the invention, not all parts shown in the figures must necessarily be present. An exemplary embodiment is shown by the figures for illustrative purposes, but the claims below define the scope of the claimed invention.

FIG. 1 is an exemplary (optical) instrument 100 for applying an image color appearance model and/or components thereof to optimize the reproduction biases of color difference in device-dependent subsystems. The instrument 100 is configured to measure 60° instrumental gloss, 0/45 circumferential relative reflectance, and 45/0 two-dimensional color appearance images (from a reflected luminance) and present these measurements to an image color appearance model of the components of which are self-consistent. Self-consistent means that the components do not present conflicting characterizations of object or sample appearance. The instrument may also be configured for a 20°, 85°, or 30° gloss measurement.

Figure 21:
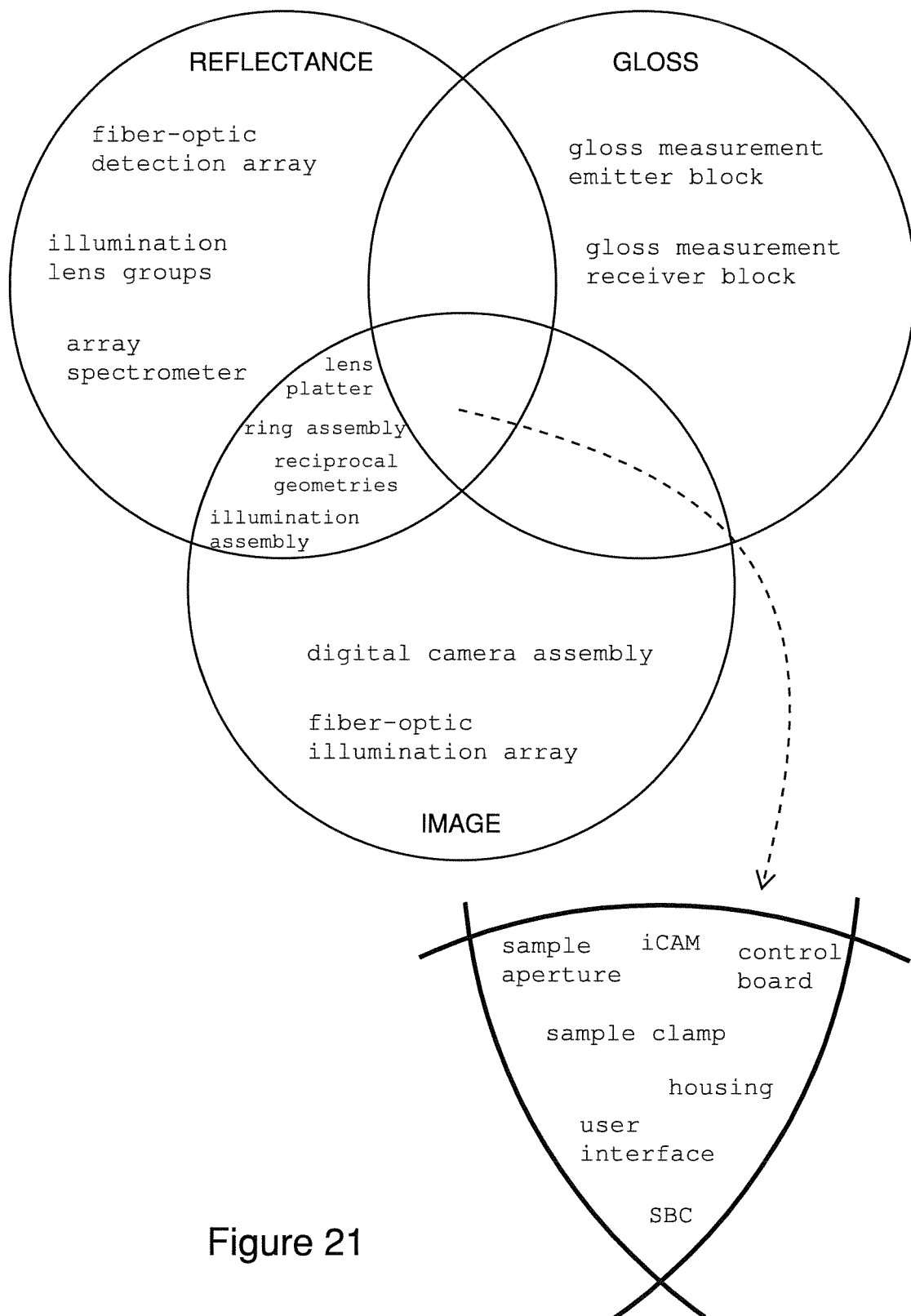
FIG. 21 is a block diagram showing relationships of components of the spectroscopy instrument with respective subsystems.

The configuration of an instrument 100 as described in the preceding paragraph may be achieved by the combination of a gloss-measuring subsystem, reflectance-measuring subsystem, and imaging subsystem, all three of which are arranged in a unitary construction. FIG. 21 illustrates these three subsystems diagrammatically.

The expression "unitary construction" as used herein may be characterized in one or more of the following ways. Unitary construction may mean all subsystems are part of a single product or device. Unitary construction may involve a common or shared housing which shields subsystems from foreign contaminants and certain environmental conditions. Unitary construction may mean subsystems, or at least parts of subsystems, have fixed spatial relationships with one another that are substantially unchanging or unchangeable. Unitary construction may mean having shared optical axes. Unitary construction may mean some or all subsystems share a common computerized controller (e.g., a main control board and/or single board computer (SBC)). Unitary construction may mean all optical subsystems are configured to measure one or more aspects of a stationary sample that does not need to be moved for different measurements. This may be achieved with, for example, a common sample port plate 104 used by some or all optical subsystems.

As a loose analogy, an automobile may be considered of a unitary construction. Doors, windows, power locks, engine, transmission, drivetrain, power steering, entertainment system, CAN bus, frame, headlights, air conditioning system, and so on and so forth—all of these are subsystems or parts of subsystems which are combined according to a unitary construction. While parts may be interchanged or replaced, and while some parts may have some degrees of freedoms with respect to other parts (e.g., doors pivot with respect to their attachment point on the frame), even a layman may appreciate the unitary construction of these elements for an automobile.

Figure 2A:
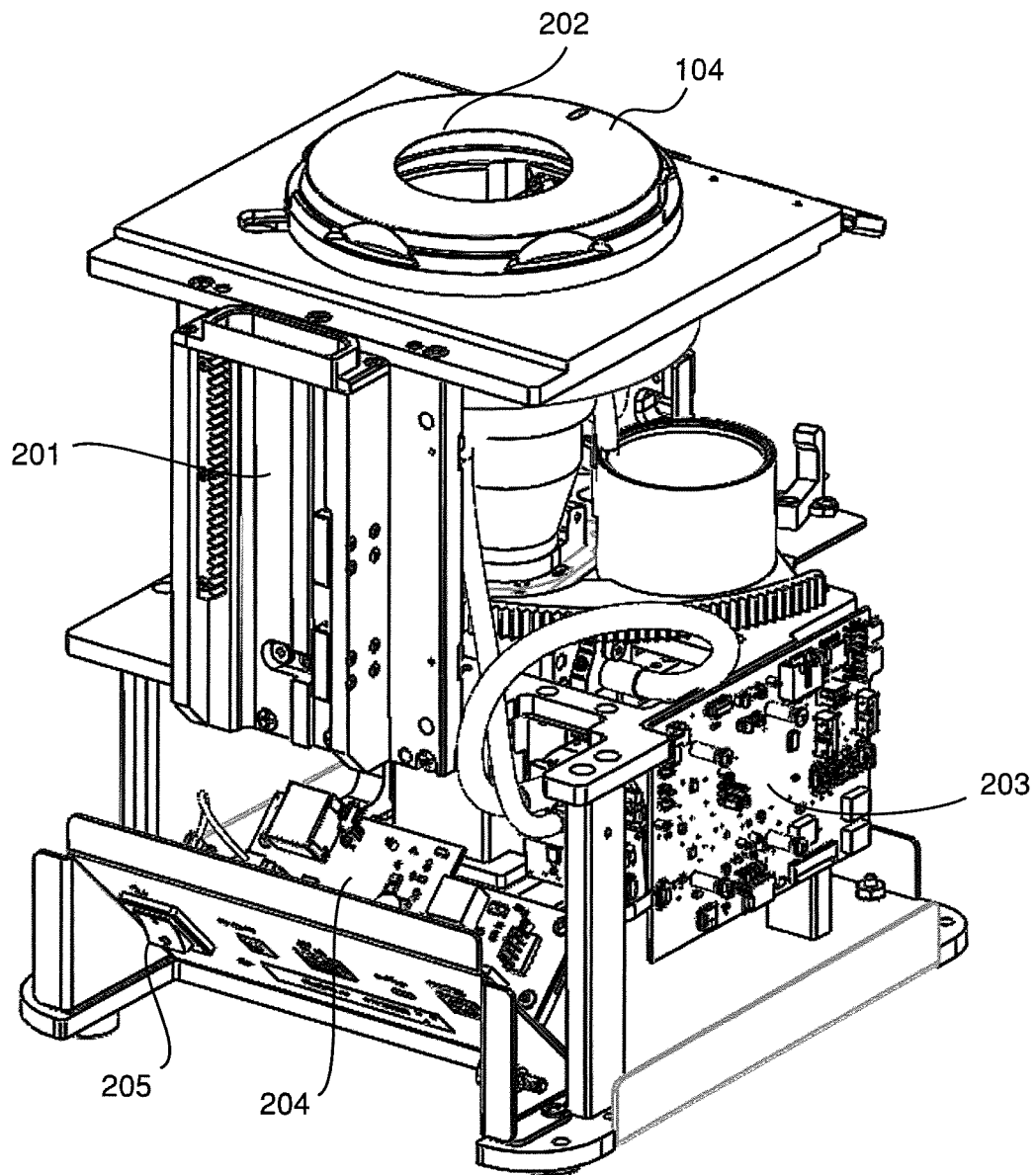
FIG. 2A is the instrument of FIG. 1 with the housing and sample clamp not shown.

FIG. 2A shows the instrument 100 with housing 103 and sample clamp 102 removed. The sample clamp receiver 201 is configured to receive and retain the sample clamp 102 in a fully assembled state. The sample clamp receiver 201 is configured to adjust a height of the sample clamp 102. The sample port plate 104 is arranged at a top surface of the instrument 100 and is configured to receive a sample on its face. The sample port plate 104 contains an aperture 202 in its center through which light may travel to contact whatever sample is thereatop the sample port plate 104. FIG. 2A also shows the main instrument control board 203 which controls activation and management of the subsystems which will be described in connection with subsequent figures.

Figure 2B:
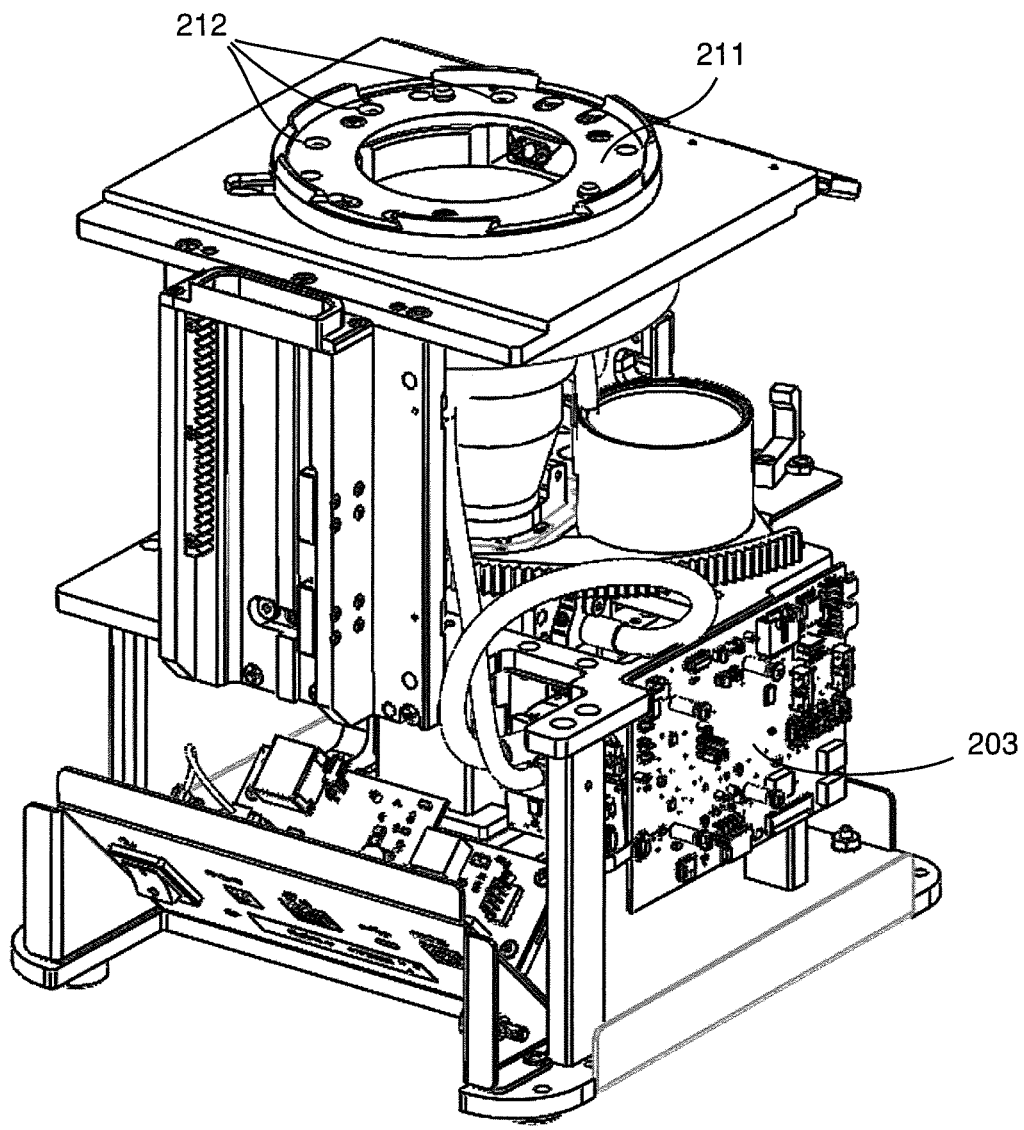
FIG. 2B is the instrument of FIG. 2A with the sample port plate not shown.

FIG. 2B shows the instrument 100 with the sample port plate 104 removed. Directly beneath the sample port plate is a sample port plate receiver 211. The sample port plate receiver 211 may be configured to receive multiple sample port plates of different configurations, e.g., plates having different aperture diameters. The sample port plates may thus be removable and interchangeable by a user in a state of use. The sample port plate receiver 211 comprises sample port plate detectors 212 configured to detect the presence and/or absence of a sample plate.

The sample port plate detectors 212 and one or more sample presence sensors are particularly advantageous with respect to safety concerns. In use, the internals of instrument 100 emit light of different wavelengths, including wavelengths in the ultraviolet (UV) spectrum. Where possible it is advantageous for human users to be shielded from direct exposure to UV light. The instrument 100 blocks or substantially blocks UV light emissions from the top of the instrument (and thus the risk of human exposure) by the combination of a sample port plate and a sample covering the aperture thereof. The instrument 100 may be configured to only permit activation of light emitting parts, in particular UV light emitting parts, when the presence of both a sample plate and a sample are detected. The sample plate detectors 212 are configured to identify whether a sample plate is present. The one or more sample presence sensors, on the other hand, are configured to sense whether a sample is present covering the aperture of the sample plate. Emitting parts and detecting parts of one of the instrument's subsystems may be used as the sample presence sensors. For example, the sample presence sensors may involve the light emitting parts of the ring assembly which are discussed in greater detail below. In particular, the fiber-optic illumination array of the ring assembly may be briefly activated, and the imaging subsystem detects whether or not light is reflected by a surface at the aperture of the sample plate. Reflected light indicates a sample is present, and vice versa. Alternatively, the illumination assembly, fiber optic array, and array spectrometer may be employed. The illumination assembly may be briefly activated, and the fiber optic array and array spectrometer used to detect whether or not a reflected signal is detected. In the absence of a detected reflectance the instrument may determine no sample is present and therefore prevent itself from emitting UV light (at least until the presence of a sample is detected). Alternatively, a sample presence sensor may be provided via the gloss-measuring subsystem. The gloss measurement emitter block may be briefly activated, and the gloss measurement receiver block is configured to detect whether or not the signal has reflected off a sample surface. Without a sample at the sample port plate, the gloss measurement receiver block would not receive a signal corresponding with what was emitted by the emitter block. One advantage of using the gloss-measuring subsystem as sample presence sensor is that the gloss-measuring subsystem is comparatively fast and presents a lower processing burden as compared to the reflectance-measuring subsystem and the imaging subsystem. The sample presence sensor may be activated as a precursor to every measurement (at least every measurement involving UV radiation) and thus the fastest and least burdensome means of detection results in faster and more efficient operation of the overall instrument.

Figure 3:
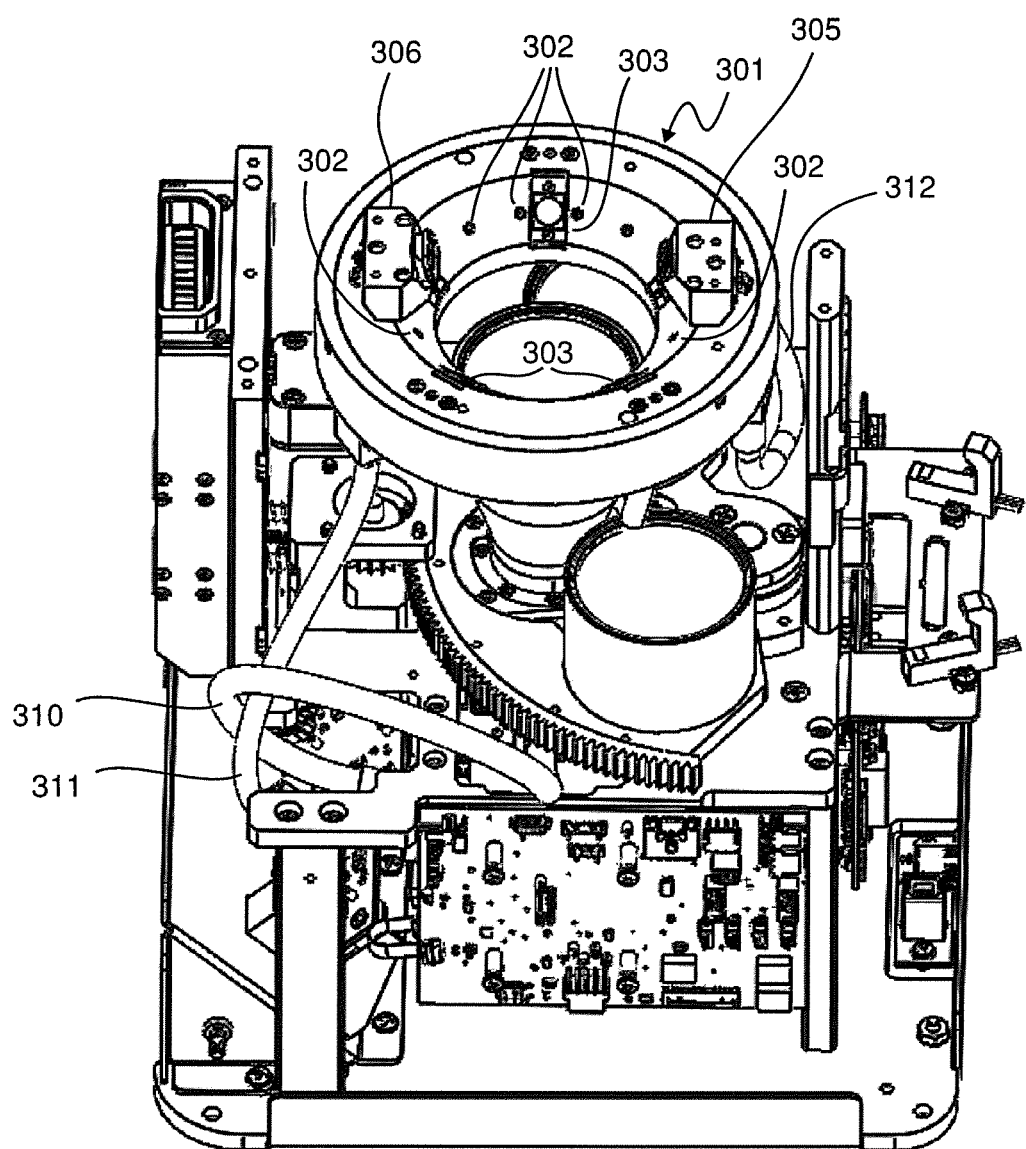
FIG. 3 is a top perspective view of the instrument of FIG. 1 with certain elements omitted to permit illustration of otherwise obscured elements.

Below and substantially adjacent to the sample port plate is a ring assembly, shown in FIGS. 3, 4, and 5. The ring assembly 301 comprises a fiber-optic detection array 302 (for the reflectance subsystem) and a fiber-optic illumination array 303 (for the imaging subsystem). The fiber-optic illumination array 303 is coupled to the illumination assembly 414 of the reflectance-measuring subsystem by fiber bundle 312 and a relay lens. Immediately adjacent to and symmetrically positioned with the ring assembly 301 are gloss measurement emitter 305 and receiver 306 blocks (for the gloss subsystem). A center axis of the ring assembly 301 is vertical (i.e., normal to ground) and is coaxial with the center axis of the sample port plate. There are no moving parts for the circumferential fiber-optic detection array 302 or fiber-optic illumination array 303, both of which are installed into one assembly (the ring assembly 301). Further details of the ring assembly 301 and its constituent parts will be discussed below in connection with the various optical subsystems (i.e., the gloss-measuring subsystem, the reflectance-measuring subsystem, and the imaging subsystem).

The instrument 100 comprises a gloss-measuring subsystem. The gloss-measuring subsystem comprises an emitter block 305 and a receiver block 306, as shown in FIG. 3. The gloss-measuring subsystem has 20°, 60°, or 85° geometry and rectangular apertures consistent with ASTM D523, which is incorporated herein by reference. Thus, with respect to the surface normal of the horizontal sampling plane of the sample port plate, the angle of incidence for light transmitted or received by the respective blocks is 20°, 60°, or 85°. The gloss-measuring subsystem comprises a light source such as one or more LED sources for CE Illuminant C. The subsystem further comprises at least two lenses: a projection lens and a receiver lens. The subsystem further comprises a y-bar color filter. The light source and projection lens are contained in the gloss measurement emitter block. The receiver lens and y-bar color filter are contained in the gloss measurement receiver block. The gloss measurement receiver block further comprises a Silicon photodetector or diode array. The 20°, 60°, or 85° geometry of the gloss-measuring subsystem also has rectangular aperture sizes for each lens element with specific requirements in accordance with ASTM D523. An alternate 30° gloss geometry includes an array of rectangular apertures and diode array receiver as shown in ASTM E430, which is incorporated herein by reference.

Color difference measurement, introduced above, can be measured using a bi-directional instrument. A bi-directional instrument will indicate a color difference that agrees with a basic visual evaluation by the human eye, but it will not distinguish color between effects of surface finish (e.g., as between two surfaces painted with the same red paint, one surface having a matte finish and the other surface having a high gloss finish, the matte surface appears lighter and less red). To properly characterize these effects, a rigorous bi-directional reflectance distribution function (BRDF) would be needed at every illumination angle, viewing angle, and wavelength. BRDF measurements are possible, but the instrumentation is costly due the required complexity.

The instrument 100 comprises a reflectance-measuring subsystem. The reflectance-measuring subsystem comprises an illumination assembly 414 (see e.g. FIGS. 4, 5 and 11), a plurality of lens and lens groups providing variable sample apertures (see e.g. FIGS. 7-10 and 12-13), a fiber-optic detection array 302 (see e.g. FIG. 3), and a spectrometer 404 (co-located with the main instrument control board 203 (see e.g. FIGS. 2A, 2B, 4, and 5). To reduce the directionality of an arbitrary sample, the 45° detection is revolved circumferentially around the sample in at least 15 equally spaced locations, each location corresponding with a separate fiber.

Figure 4:
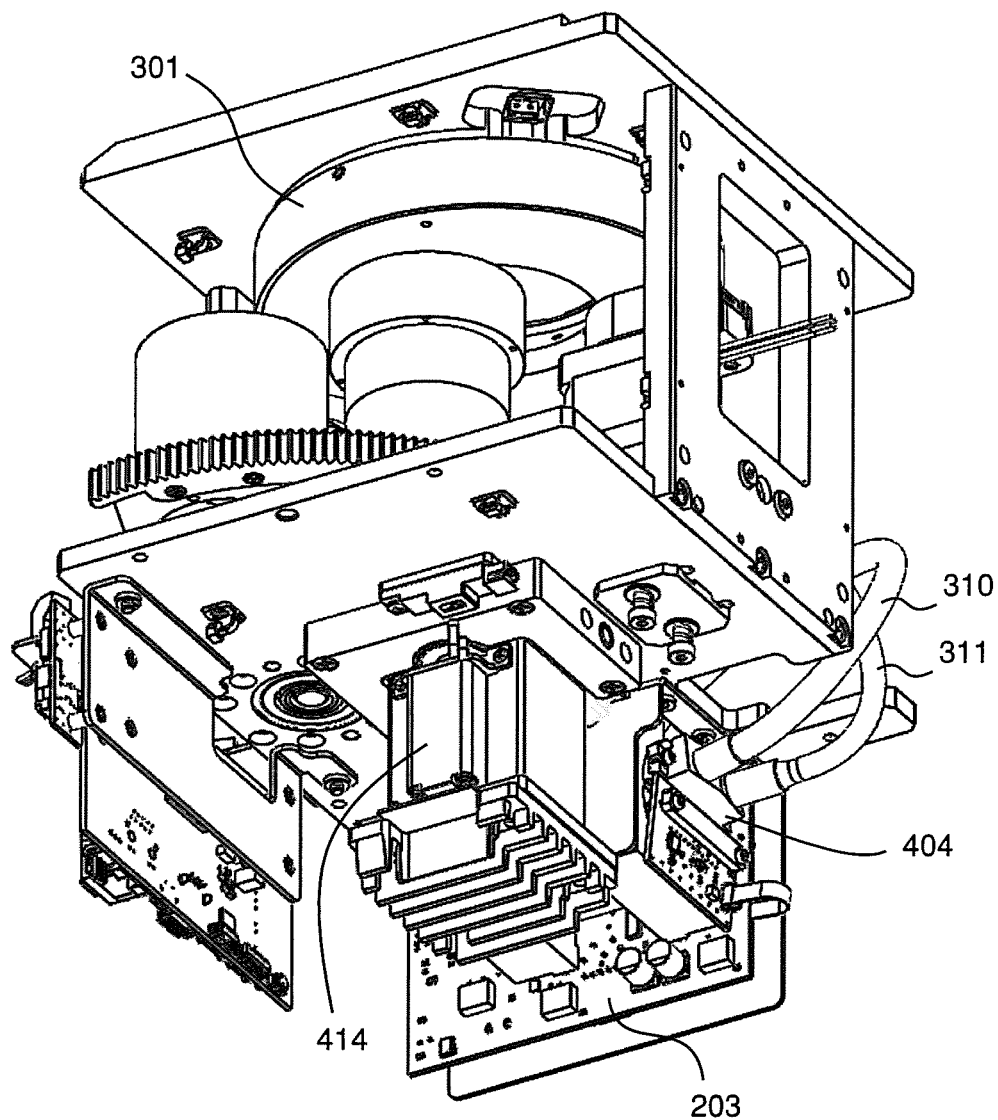
FIG. 4 is a bottom perspective view of the instrument of FIG. 1 with certain elements omitted to permit illustration of otherwise obscured elements.
Figure 5:
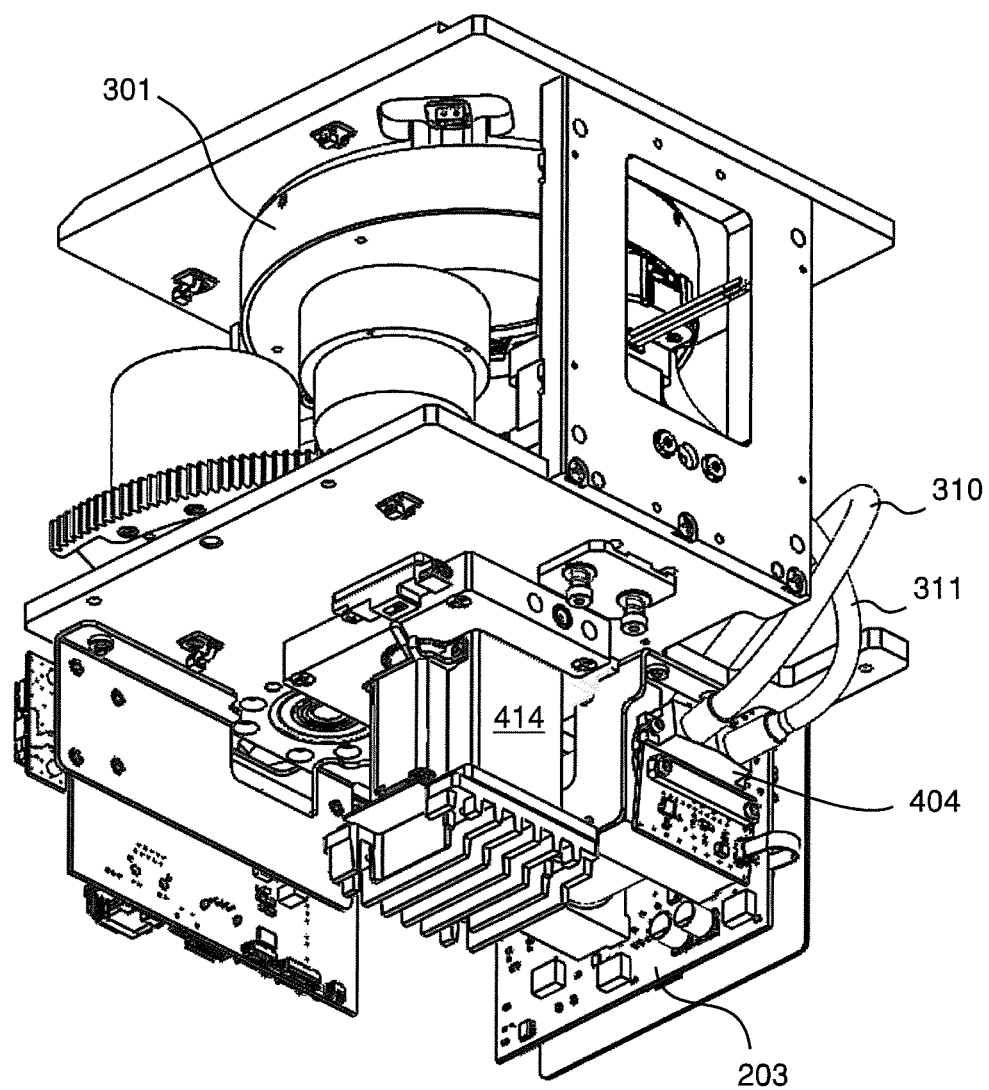
FIG. 5 is another bottom perspective view of the instrument of FIG. 1 with certain elements omitted to permit illustration of otherwise obscured elements.

The fibers 310 from a monitor channel (see FIGS. 12 and 13) and the fibers 311 from the fiber-optic detection array 302 of the ring assembly 301 (see FIG. 3) are separately bundled and input to the spectrometer (see FIG. 4).

Figure 6:
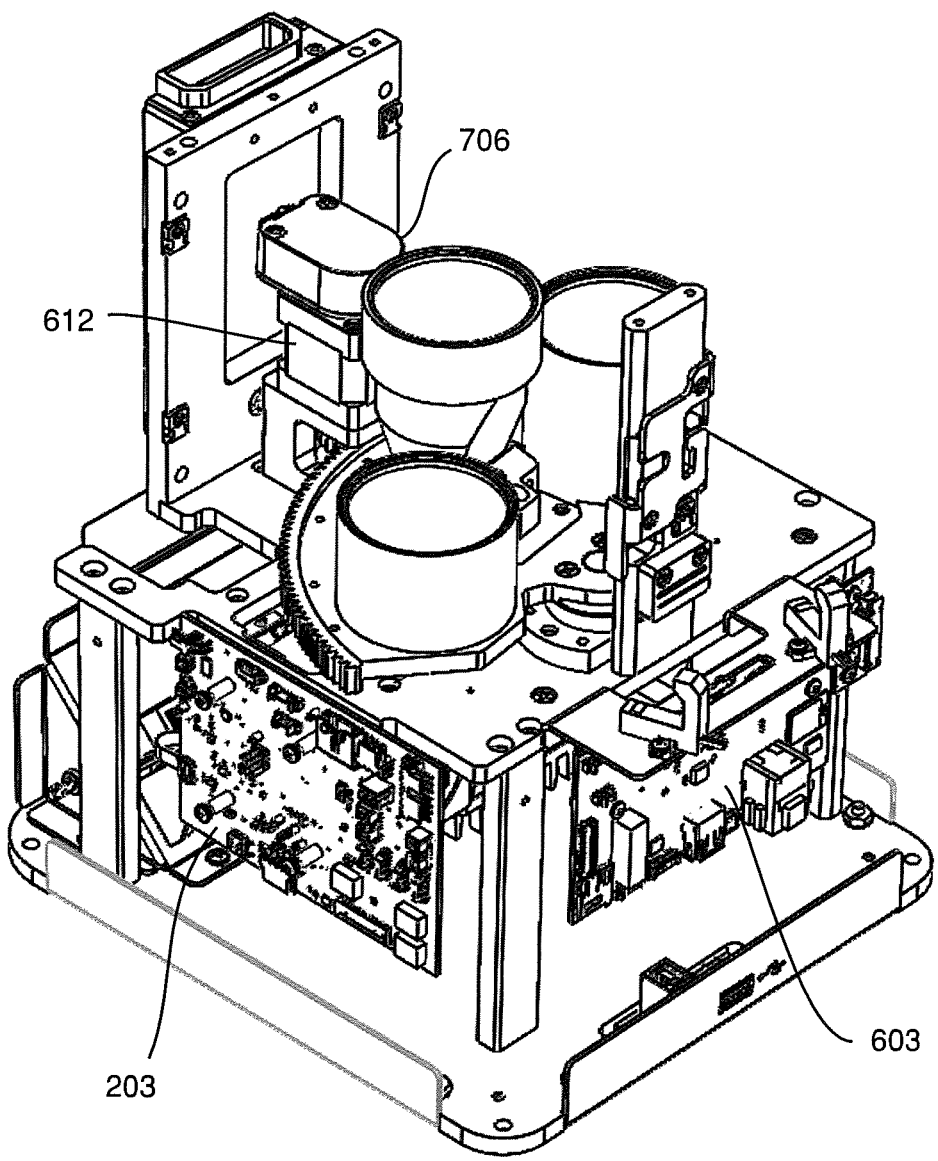
FIG. 6 is another top perspective view of the instrument of FIG. 1 with certain elements omitted to permit illustration of otherwise obscured elements.

The instrument 100 further comprises a controller which is configured for operating (e.g., activating) the multiple subsystems and integrating their measurements. In the figures, the controller comprises a main instrument control board 203 and single board computer 603 (SBC) (see e.g. FIG. 6). Alternative controllers or controller configurations may be employed in different embodiments. The controller may be described as an electronic controller or a computerized controller. A computerized controller comprises one or more processors and may contain memory, input/output devices, and a power system, among other elements. FIG. 2A shows for example an I/O and power board 204 with features such as a power switch 205. The controller may comprise a combination of hardware, software, and/or firmware. The controller may be configured to communicate with one or more external devices, such as an external computer or smart device. The controller permits operation of the instrument 100 and generation of a self-consistent iCAM without the support of any external hardware, with the exception of a power source such as a standard wall outlet.

A computerized controller may further comprise image processing means (e.g., programming or algorithm). One image processing may be histogram equalization to enhance local contrast (and allow for correlation of a spectral signature), in addition to tone mapping that is already used in color appearance models for higher dynamic range (for example, CIECAM02).

Variable sample apertures (of diameters which are 0.1" to 2") are provided using two switchable lens assemblies and a variable field-stop. The two lens groups are identified in FIGS. 7-10 as small area-of-view (SAV) illumination lens group 701 and large area-of-view (LAV) illumination lens group 702. The SAV illumination lens group 701 is configured for 0.1"-1" sample apertures, and the LAV illumination lens group 702 is configured for 1"-2" apertures. The apertures are user-selectable. The aperture system is analogous to a zoom lens, but allows for the transfer of wider-angle LED emission (1200 full width at half max (FWHM)) with an efficiency up to 70%. At least 16 LEDs can be supported within the field of view of the illumination in a 0.25"×0.25" square footprint.

The multiple lens groups are fixedly secured to a motorized lens platter 705. The motorized lens platter 705 is rotatable about a fixed axis using an optical encoder 706, stepper motor 612 (visible in FIG. 6), and curved gear rack 707. The motorized lens platter 705 is configured to permit a plurality of optical elements arranged thereon to be interchangeably positioned along a 0° axis along which light travels from the illumination assembly 414 of the reflectance-measuring subsystem (see e.g. FIG. 11) to the ring assembly 301 and sample port plate 104 above. The 0° axis of the reflectance-measuring subsystem is coaxial with the center axes of the ring assembly 301 and sample port plate 104.

Figure 7:
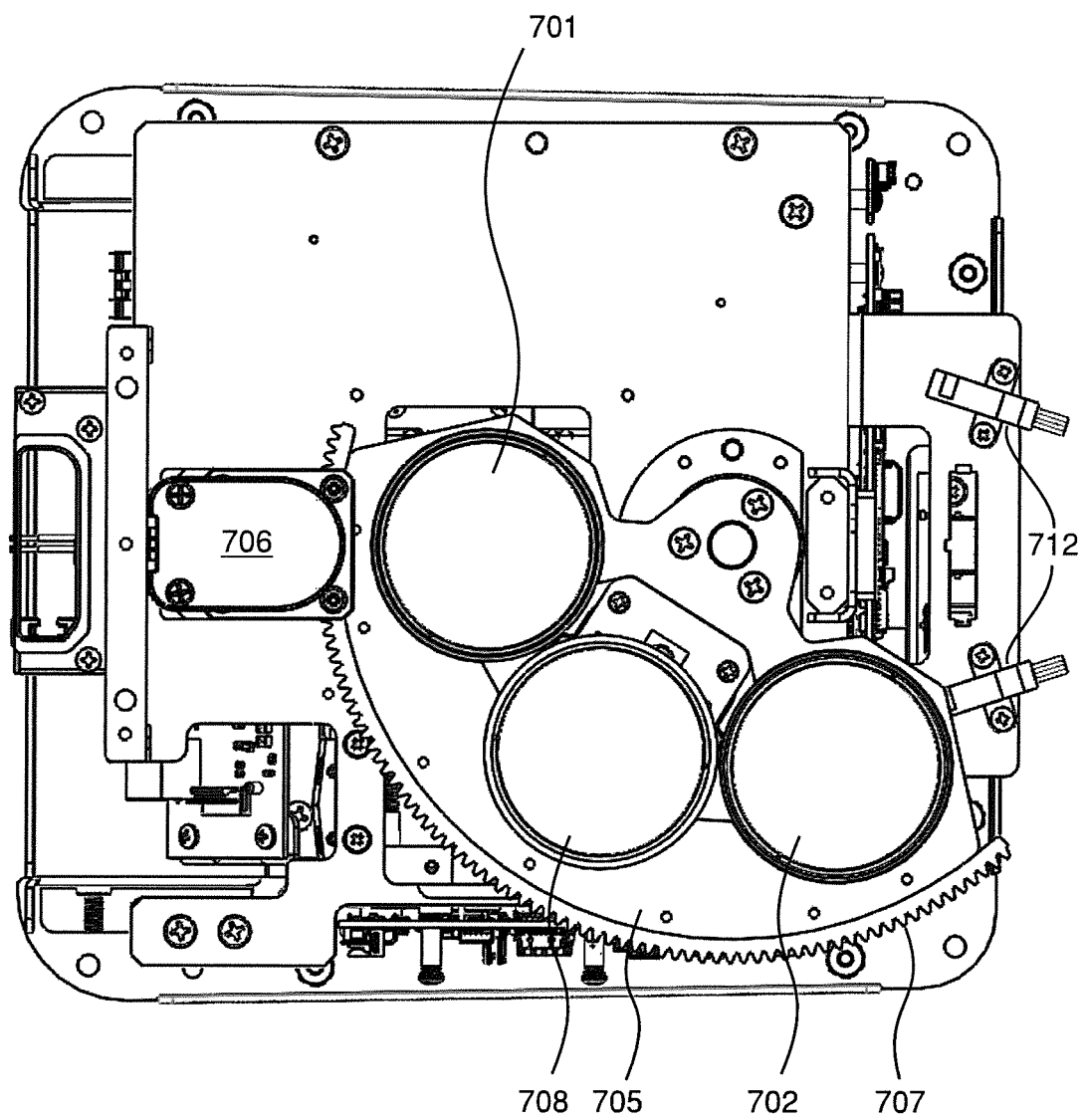
FIG. 7 is a top plan view showing the lens platter in the small area-of-view (SAV) measuring position.
Figure 8:
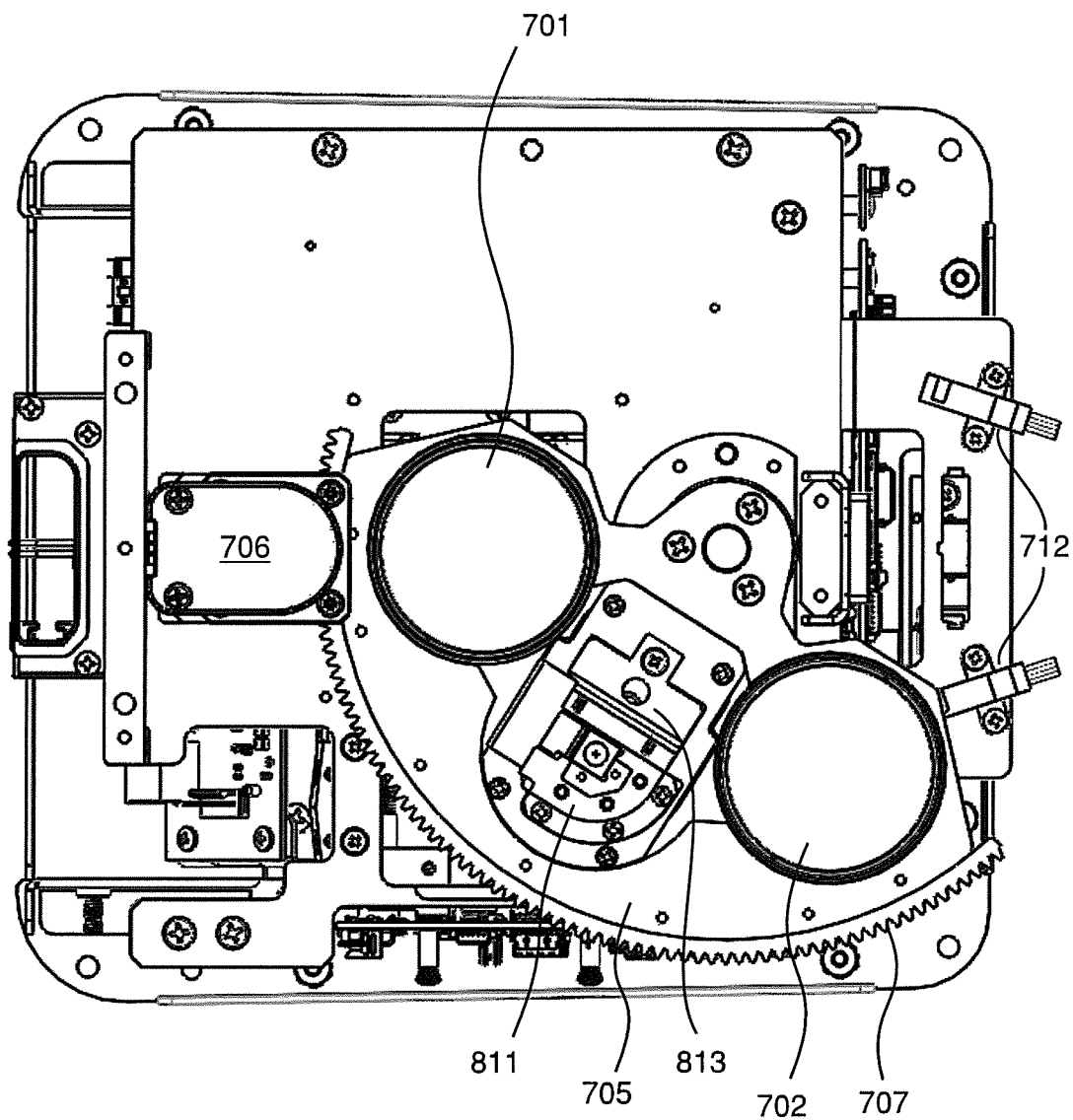
FIG. 8 is the view from FIG. 7 but with the optional telecentric lens assembly omitted to permit illustration of the otherwise obscured digital camera assembly.
Figure 9:
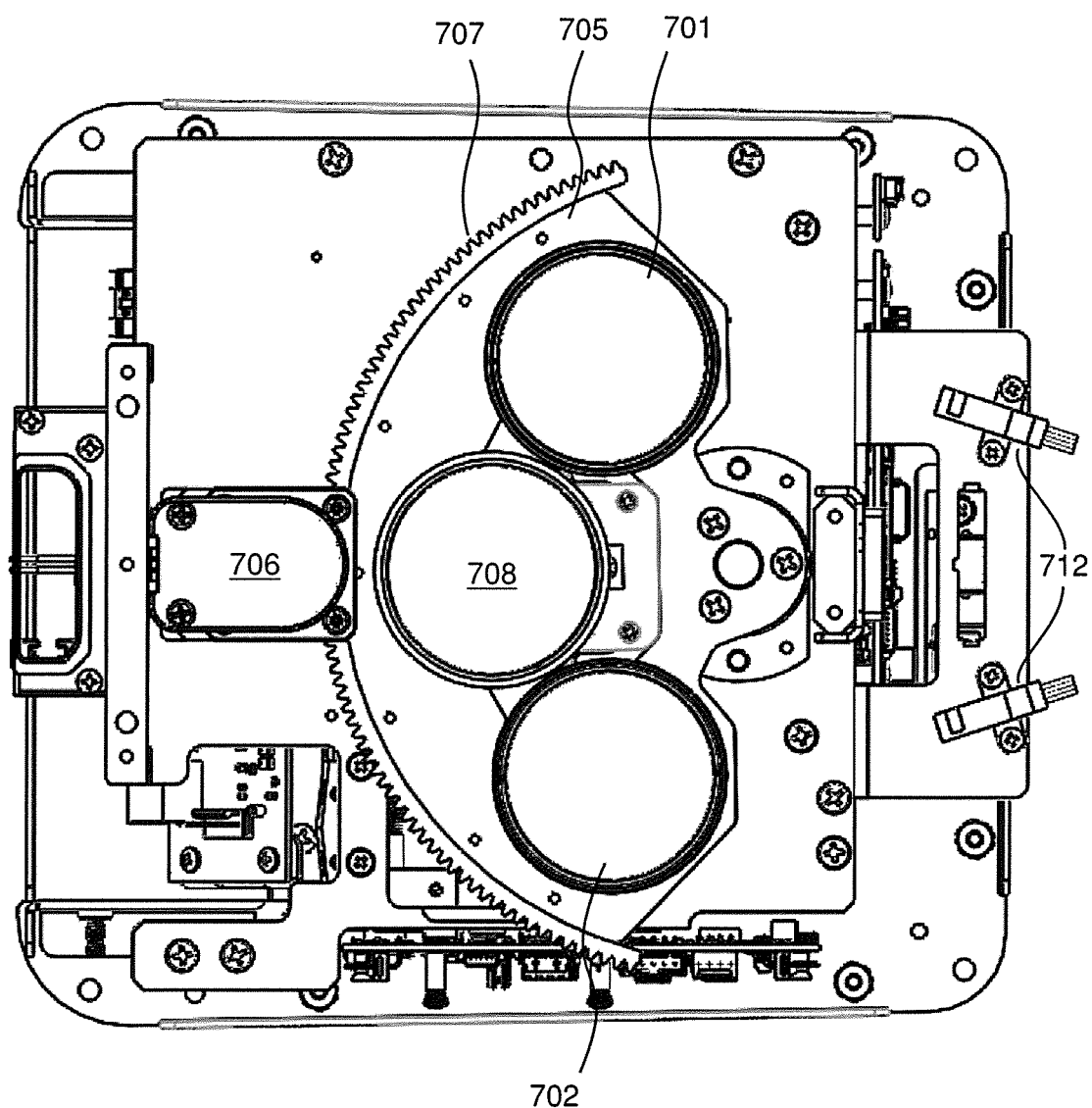
FIG. 9 is a top plan view showing the lens platter in the camera imaging position.
Figure 10:
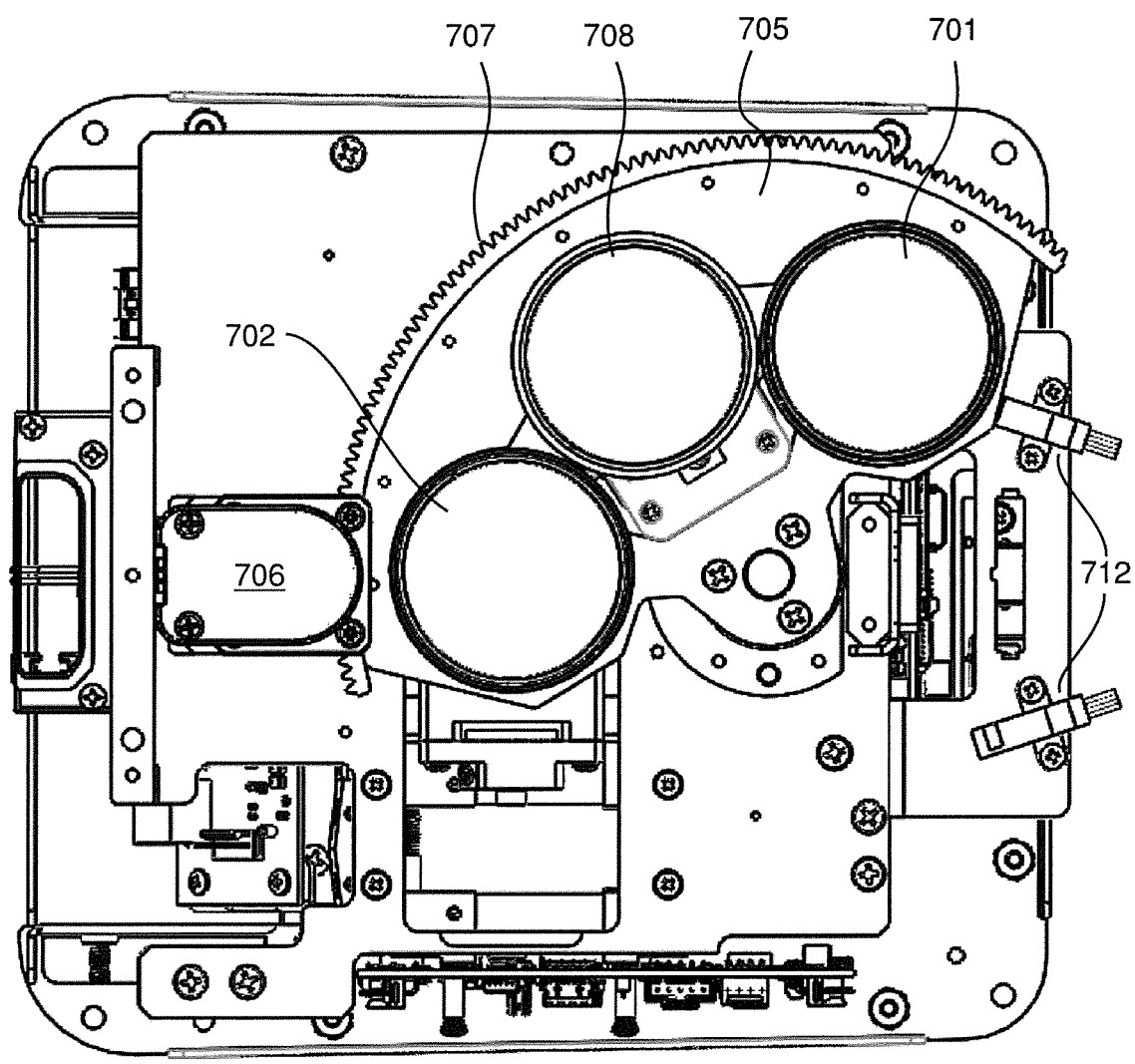
FIG. 10 is a top plan view showing the lens platter in the large area-of-view (LAV) measuring position.

FIG. 7 shows the SAV illumination lens group 701 aligned with the 0° axis. The 0° axis comes out of the page in FIGS. 7, 8, 9 and 10. FIG. 8 is similar to FIG. 7 but hides a telecentric lens assembly 708 to permit view of the digital camera assembly 811 arranged beneath the telecentric lens assembly 708. Some embodiments may have the telecentric lens assembly 708, while other embodiments may not. FIG. 9 shows the telecentric lens assembly 708 and camera assembly 811 aligned with the 0° axis. FIG. 10 shows the LAV illumination group 702 aligned with the 0° axis. The alignment of the lens groups with the 0° axis is highly controlled for precision and accuracy via the optical encoder 706, stepper motor 612, curved gear rack 707, and lens platter optical limit switches 712.

Figure 11:
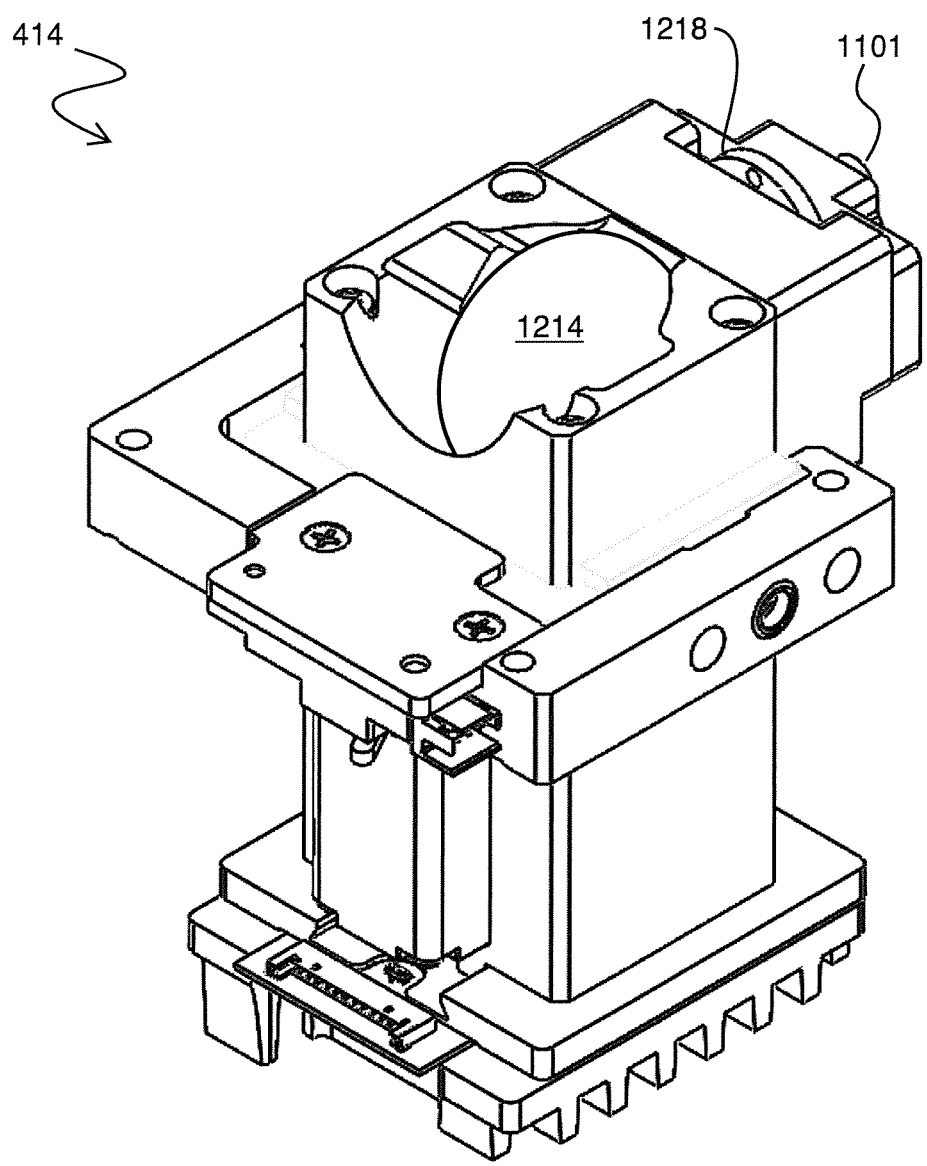
FIG. 11 is the illumination assembly that provides illumination for the reflectance and imaging subsystems.

FIG. 11 shows the illumination assembly 414 for the reflectance-measuring subsystem. The position of the illumination assembly 414 within the instrument 100 is shown in FIGS. 4 and 5. A beamsplitter 1214 supplies light produced from the illumination assembly 414 both vertically along the 0 deg axis (see description of FIGS. 7-10 above) and perpendicularly to a monitor channel 1101. The monitor channel 1101 is optically connected with the spectrometer 404 by fiber bundle 311 (see FIG. 4).

Figure 12:
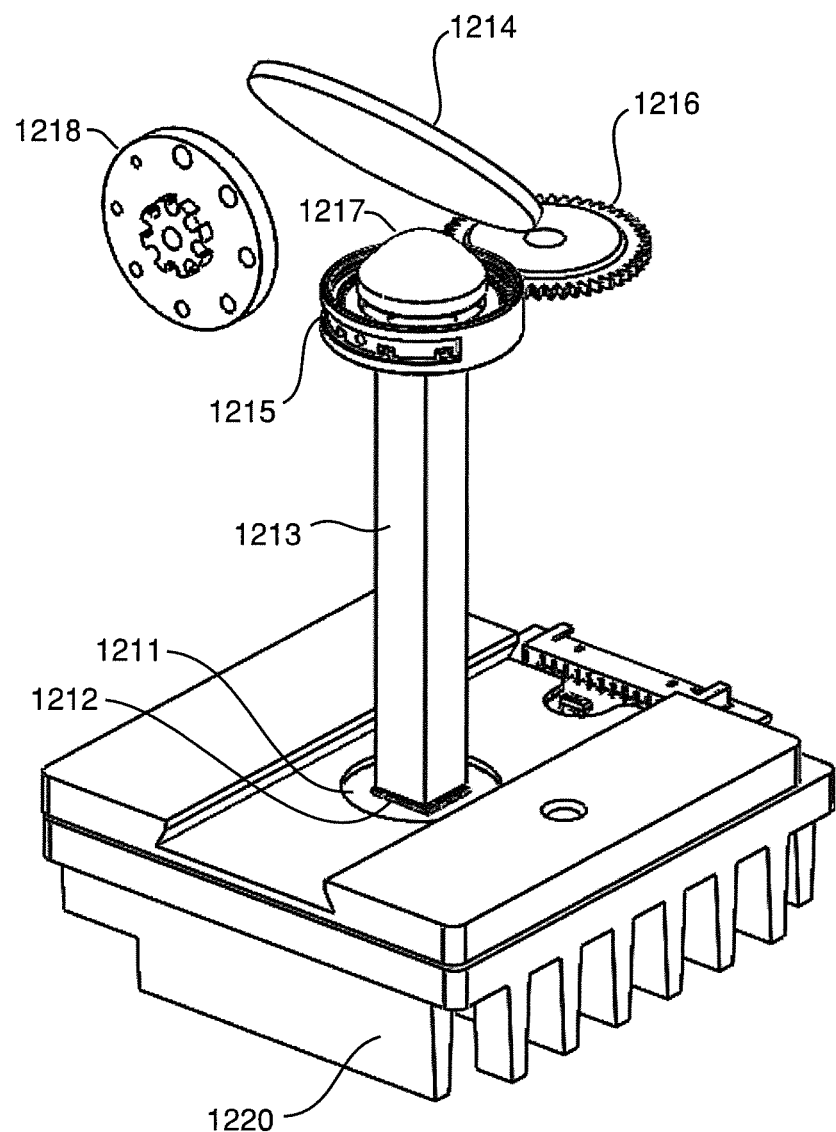
FIG. 12 is the illumination assembly with certain elements omitted to permit illustration of otherwise obscured elements.
Figure 13:
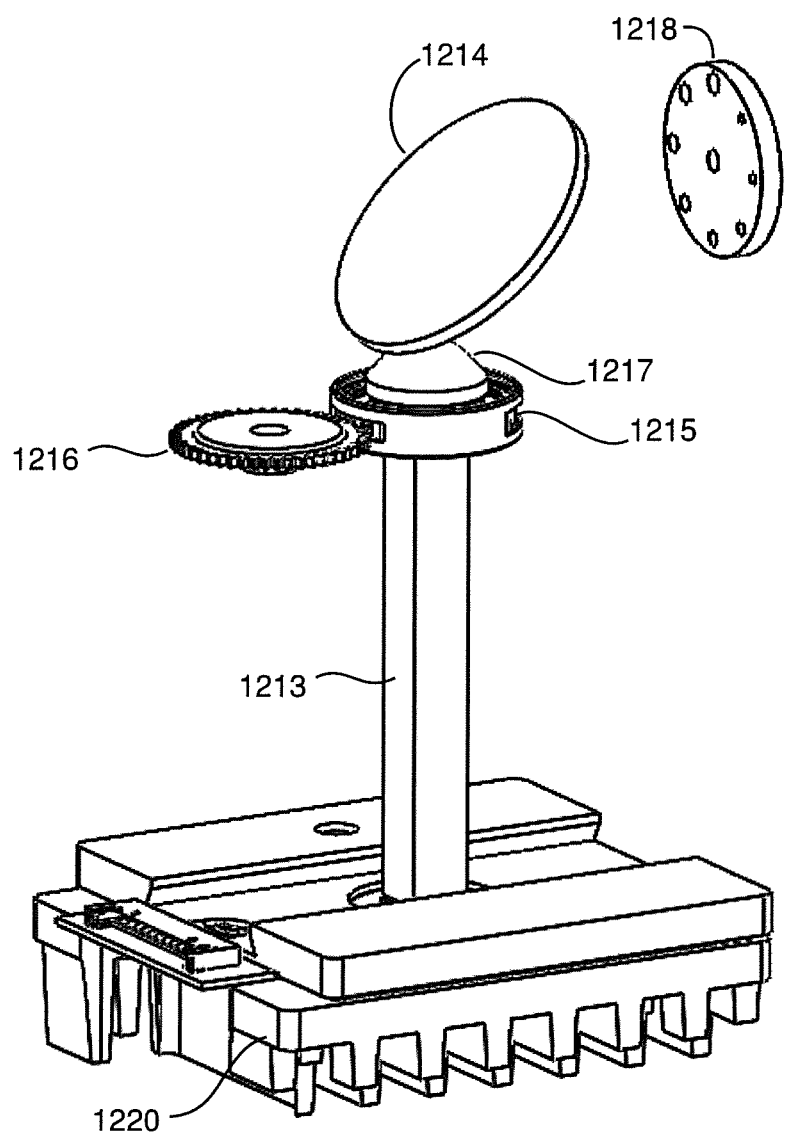
FIG. 13 is another view of the illumination assembly with certain elements omitted to permit illustration of otherwise obscured elements.

FIGS. 12 and 13 show the internals of the illumination assembly 414. An LED array 1212 is arranged at a bottom of the illumination assembly 414 on a printed circuit board 1211 (PCB). The LED array 1212 may be highly compact, e.g., having at least 16 or more LEDs within a 0.25" by 0.25" surface area. Respective LEDs emit different wavelengths of light, and different combinations of the LEDs may be activated to achieve any of a wide range of different outputs. Above the LED array 1212 is a color mixing light pipe 1213 (e.g., a polished square glass rod) configured to homogenize light emitted from a plurality of LEDs of the LED array 1212 for uniform CIE Illuminant D65 output, including ultra-violet light 360-400 nm for measuring fluorescent whiting agents. The LED array 1212 is controllable to output a variety of different illuminants. The UV content is controlled by discrete ~10 nm FWHM LEDs, with center wavelengths such as 365, 380, and 395. The instrument 100 has discrete control over each LED which enables the measurement characterization of a fluorescing sample emission as a function of its excitation.

In addition to the LED array 1212 and light pipe 1213, the illumination assembly 414 further comprises a reference channel beamsplitter 1214, a field stop 1215 with a variable field stop iris (e.g., factory-set or adjustable with motorized gear 1216), an illumination focusing lens 1217, and a sample channel iris 1218 (e.g., factory-set or motorized). The reference channel monitors fluctuations in the light output of the LED sources. The PCB 1211 which comprises the LED array 1212 has one or more heat sinks 1220 to dissipate heat from the LED array 1212, thereby encouraging constant temperature conditions within the instrument 100.

Light emitted from the illumination assembly 414 is transmitted vertically through the instrument along the 0° axis. The light path passes through one of the lens groups 701 or 702 of the motorized lens platter 705, whichever is positioned on the 0° axis for a particular sample measurement. After the lens group the light path reaches the sample (arranged at the aperture 202 of the sample port plate 104), and reflectance therefrom is collected by the fiber-optic detection array 302. The fiber-optic detection array 302 is a circumferential ring of fibers bundled into one common output for the array spectrometer 404 (co-located with the main instrument control board 203, see FIG. 4). There is a reference channel in the array spectrometer 404 that monitors fluctuations in the LED sources.

The instrument 100 further comprises an imaging subsystem configured to capture one or more two-dimensional color appearance images. The imaging subsystem comprises a camera assembly 811 in the 45/0 geometry with a circumferential fiber-optic illumination array 303 embedded in the same ring assembly 301 as the fiber-optic detection array 302 of the reflectance-measuring subsystem. The fiber-optic illumination array 303 of the imaging subsystem may comprise, for example, five or more fiber illumination ports evenly spaced about the ring assembly 301 (see FIG. 3). The imaging subsystem comprises within the camera assembly 811 an image sensor, lens attachment, and the fiber illumination coupler 813 comprising a relay lens adjacent to 1217. The coupler 813 optically couples the illumination assembly 414 with a fiber bundle 312 (visible in FIG. 3) when the camera assembly 811 is arranged in the 0° axis of the reflectance subsystem. The fiber bundle 312 guides light generated from the illumination assembly 414 to the fiber-optic illumination array 303 by total internal reflection. As a result both the reflectance subsystem and the imaging subsystem may use the same light source. Using the same LED array 1212 in two subsystems assists in achieving self-consistent viewing conditions.

The image sensor may be, for example, a charge-coupled device (CCD), complementary metal-oxide-semiconductor (CMOS), or some variant of one or both of these. The image sensor may take any of a number of configurations, including but not limited to RGB or multispectral color filters arrays, linear variable filters, and dispersive forms of hyperspectral imaging. The most native digital image sensor format is the RAW pixel output created by the color filter array that is attached to the sensor. Furthermore, to properly characterize the RAW pixel output, any gamma correction of the luminance and tristimulus values should be equal to unity, which is represented by the term RAW/linear.

The camera assembly's image sensor is calibrated to the relative reflectance measurement (of the reflectance-measuring subsystem) and instrumental gloss measurement (of the gloss-measuring subsystem). More specifically, the image sensor output is calibrated to both a relative reflectance measurement (averaged over one or more sample apertures via a variable field-stop), and an instrumental gloss measurement (averaged over one or more sample apertures in the same range via a variable aperture-stop). Traditional calibration of cameras uses known standards (such as the Macbeth color-chart) to calibrate the variations across device-dependent sensors. For a successful calibration, it is important for the same experimental conditions to be reproduced as much as possible (such as geometry and the illumination-detection spectrum). The self-consistent instrument 100 performs this process in-situ by minimizing the color difference error between the image sensor and the relative reflectance measurement.

An output of the imaging subsystem (or a part thereof) is an array of color differences, corresponding to the error at each pixel. Historically the color difference metrics have been developed for comparing solid color patches under precise viewing conditions. If a sample were to have a complex shape, however, then the color difference would no longer be valid as information can be lost due to averaging. Therefore, for an exemplary instrument 100, in addition to the initial mapping of the relative reflectance to the image sensor RAW/linear pixel values, an image color appearance model (iCAM) is used to separate the spatial characteristics of the two-dimensional imagery within a local color difference metric. By starting with a self-consistent image sensor using average reflected color, the spatial content can then be characterized in terms of gradients of the color difference metrics (i.e. $\nabla L^*$, $\nabla a^*$, $\nabla b^*$, where the nabla symbol ($\nabla$) represents differential operators applied to the two-dimensional image), as well as measuring the influence of gloss on object appearance.

Figure 14:
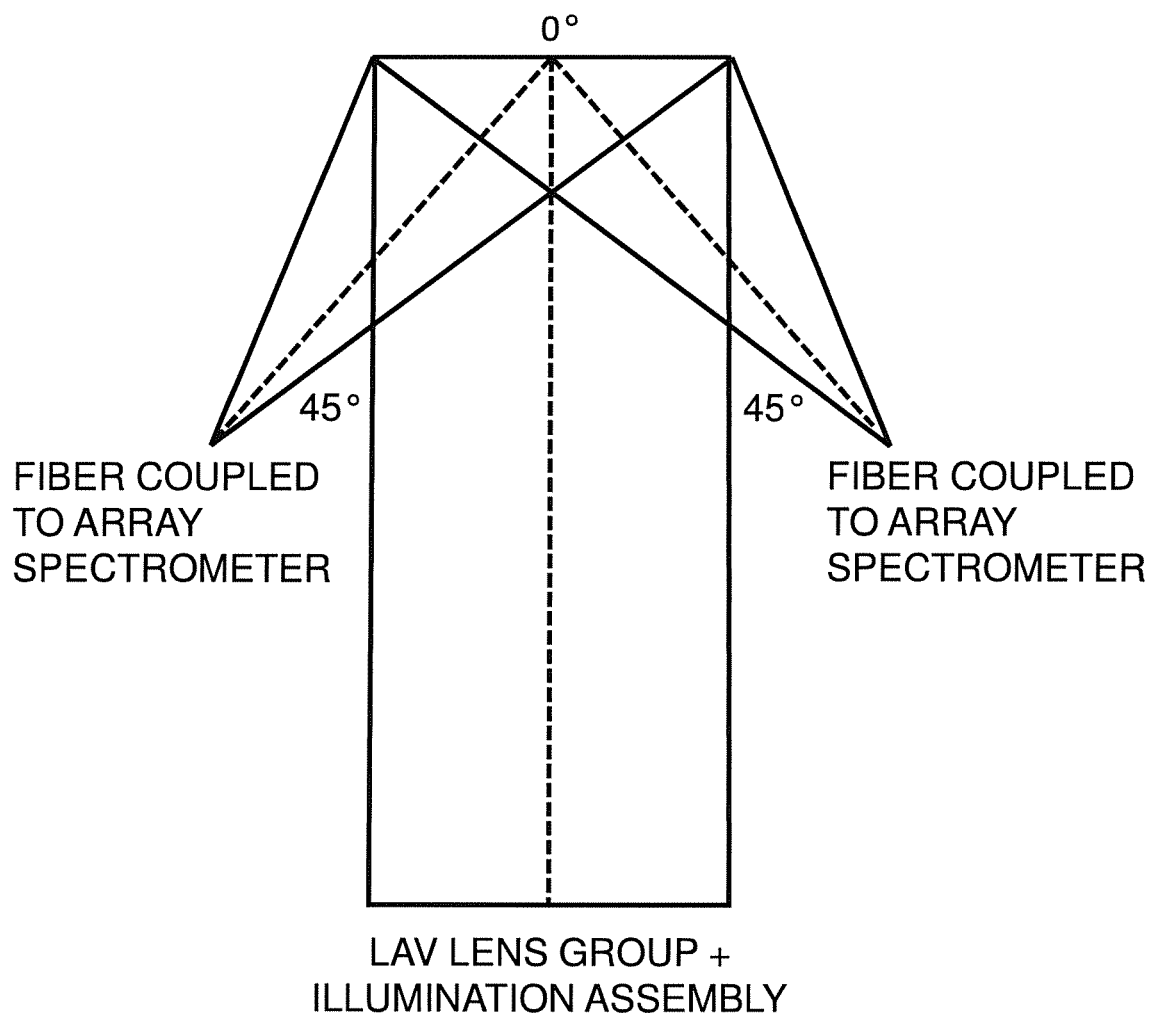
FIG. 14 is an optical diagram which illustrates geometry concerning the reflectance-measuring subsystem.

FIG. 14 is an optical diagram which illustrates geometry concerning the reflectance-measuring subsystem. Light from the illumination assembly 414 is transmitted upward along the 0° axis. After passing through the LAV lens group 702, the light strikes the surface of the sample at aperture 202. The light which reflects along the 45° direction reaches the fiber-optic detection array 302 of the ring assembly 301 and is collected thereby and transmitted to the array spectrometer 404. While FIG. 14 is depicted in two-dimensions, it should be appreciated that the fiber-optic detection array 302 has fibers circumferentially arranged about the ring assembly 301 so that light reflected along any 45° direction may be collected by the fiber-optic detection array.

Figure 15:
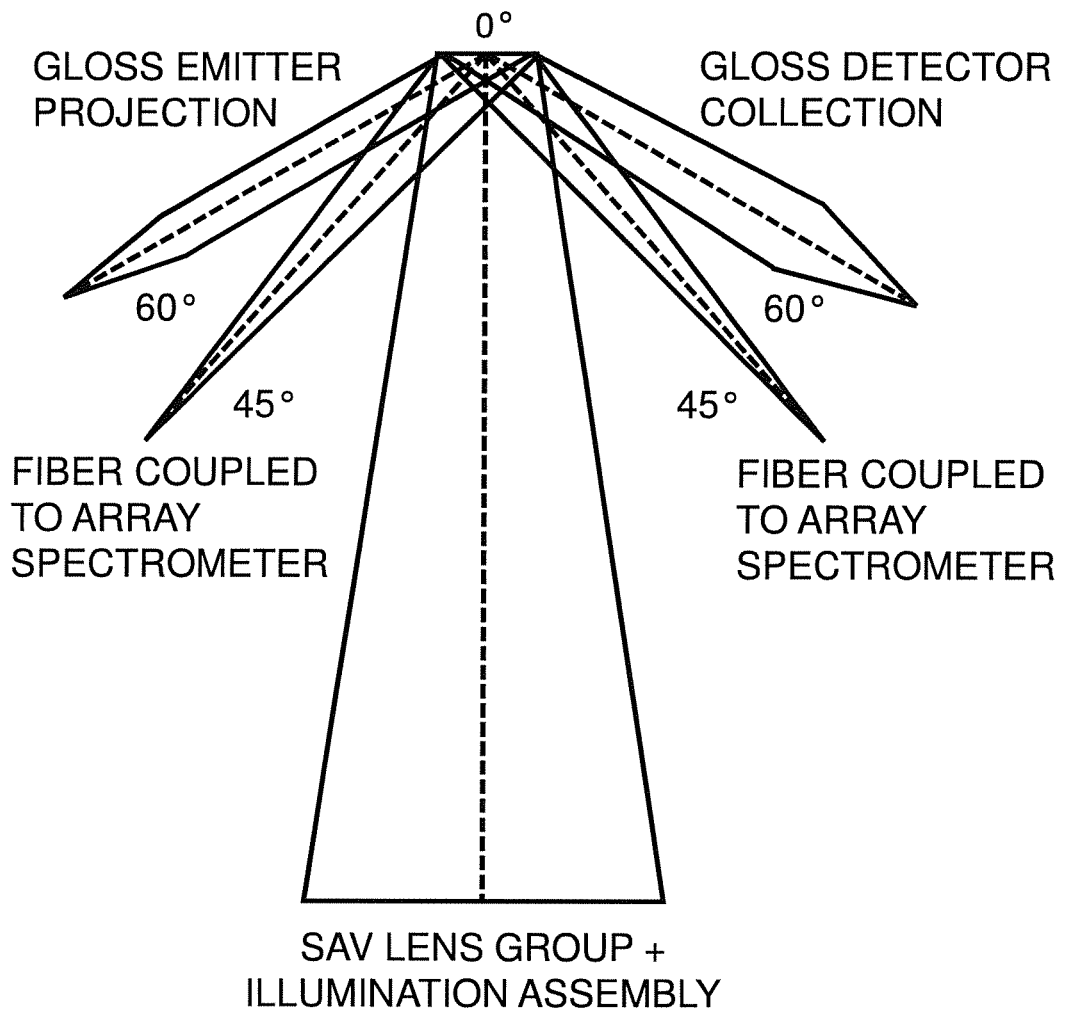
FIG. 15 is an optical diagram which illustrates geometry concerning the reflectance-measuring subsystem as well as the gloss-measuring subsystem.

FIG. 15 is an optical diagram which illustrates geometry concerning the reflectance-measuring subsystem as well as the gloss-measuring subsystem. Note that the SAV lens group 701 is used in FIG. 15 whereas the LAV lens group 702 was used in FIG. 14. The SAV lens group focuses the light beam, as illustrated in FIG. 15. As in FIG. 14, the fiber-optic detection array 302 collects reflected light per a 0/45 geometry. Gloss emission and gloss detection uses a 60/60 geometry. FIG. 15 illustrates that the reflectance-measuring subsystem (while employing the SAV lens group 701) and the gloss-measuring subsystem may involve the same sample aperture size.

Figure 16:
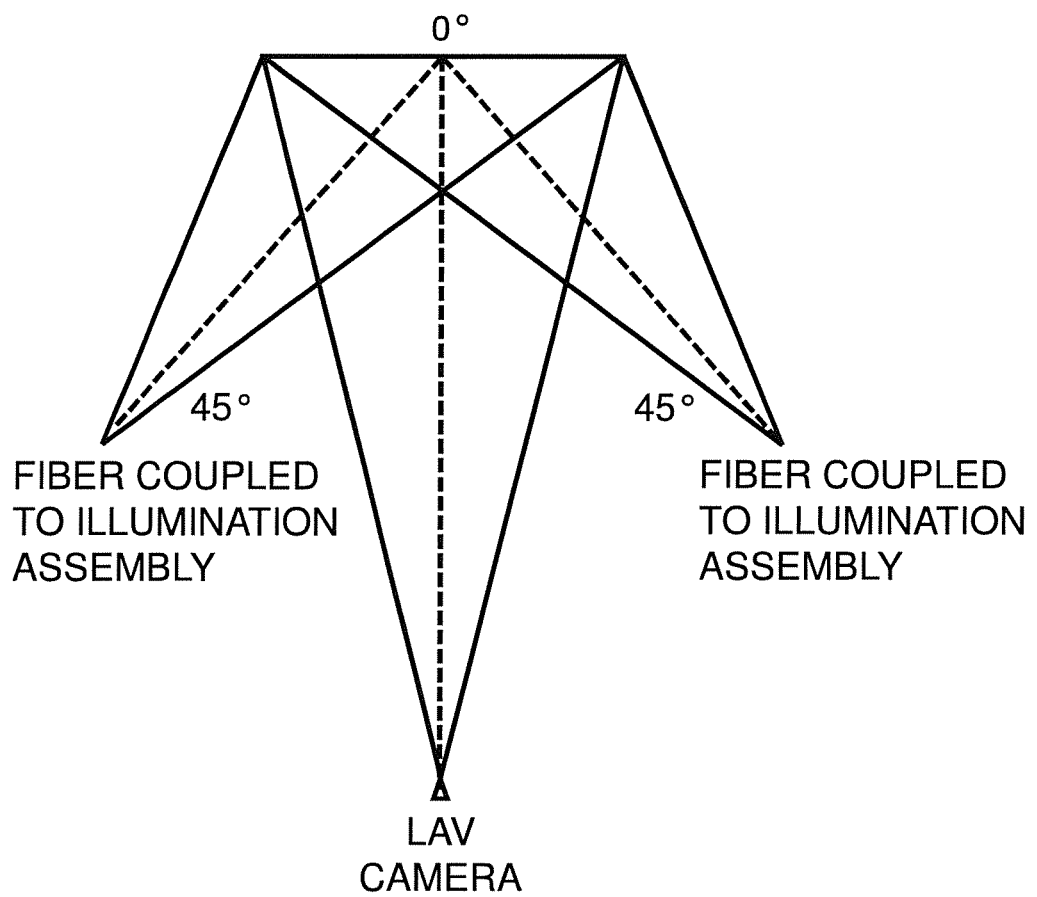
FIG. 16 is an optical diagram which illustrates geometry concerning the imaging subsystem with a large area-of-view (LAV) configured camera.
Figure 17:
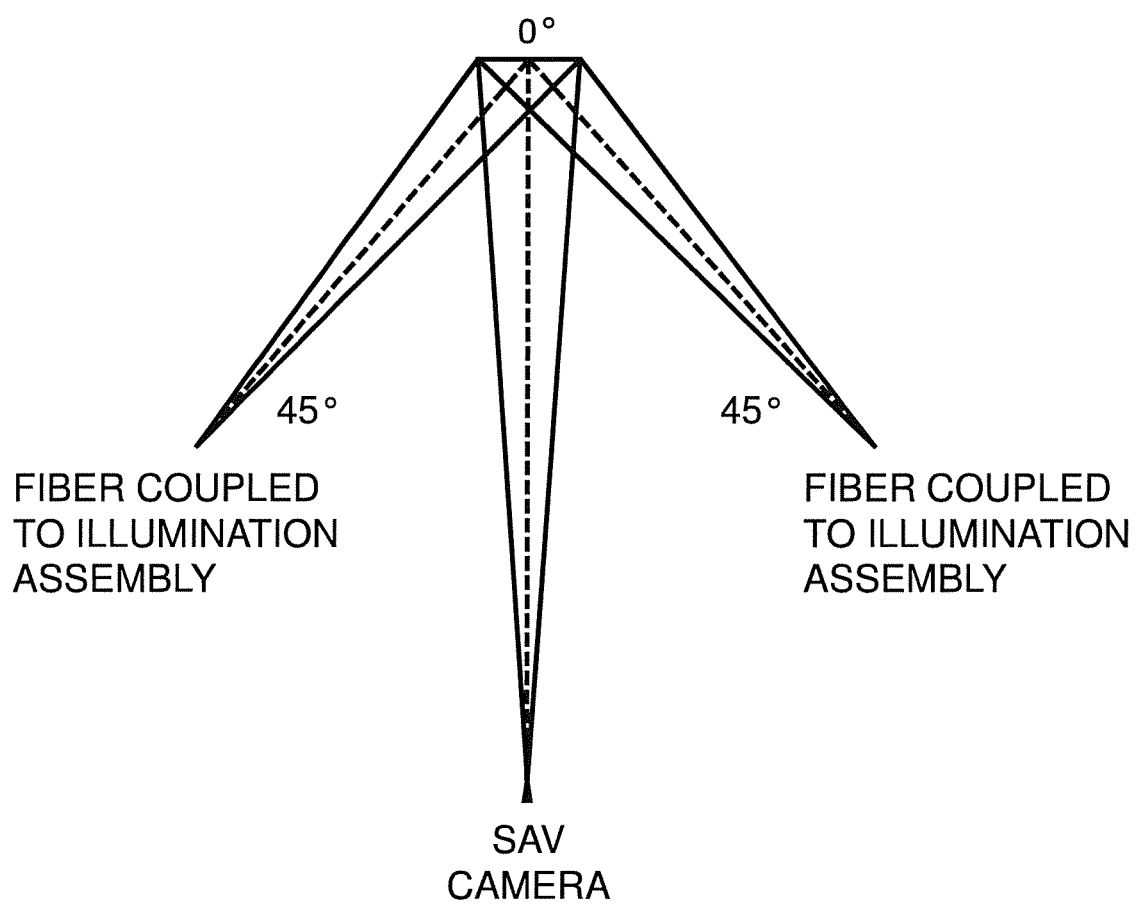
FIG. 17 is an optical diagram which illustrates geometry concerning the imaging subsystem with a small area-of-view (SAV) configured camera.

FIGS. 16 and 17 are optical diagrams which illustrate geometry concerning the imaging subsystem. The sensor pixel data of the imaging subsystem may also be segmented into multiple area-of-view configurations, e.g. a small area-of-view (SAV) configuration and large area-of-view (LAV) configuration. The corresponding geometries of the light beams associated with an LAV-configured camera and a SAV-configured camera are shown in FIGS. 16 and 17, respectively. The imaging subsystem has a 45/0 geometry, allowing it to overlap in physical space with the 0/45 geometry of the reflectance-measuring subsystem. The motorized rotation stage (platter 705) permits an interchange between the illumination axis of the reflectance-measuring subsystem and the measurement axis of the imaging subsystem. That is, in the reciprocal design, illumination by the illumination assembly 414 (FIG. 11) at 0° can be interchanged with measurement by the digital camera assembly 811 at 0° via the motorized rotation stage.

Figure 18:
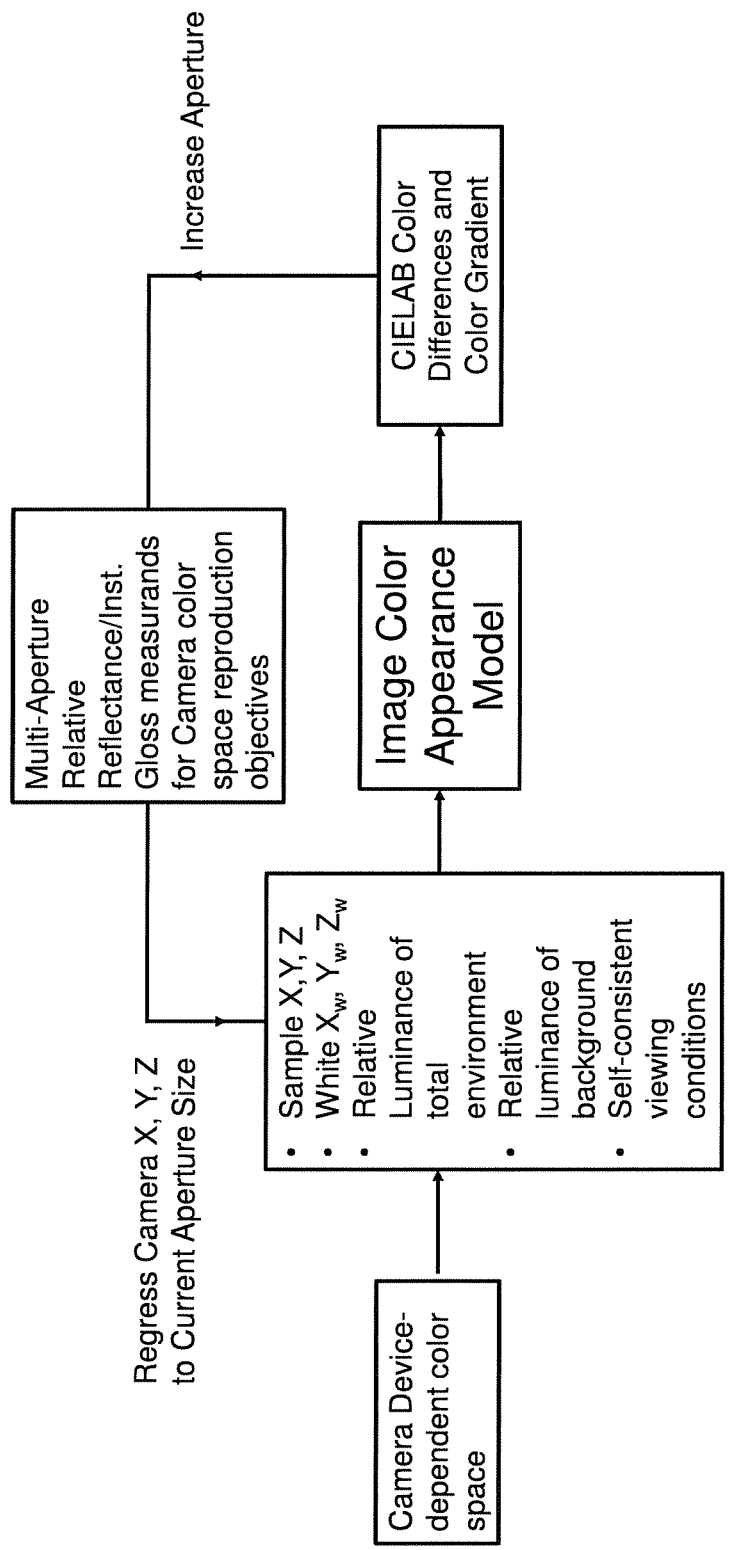
FIG. 18 is a functional block diagram for self-consistent color reproduction that is a function of area-averaged apertures of varying diameter.

An exemplary output of an instrument 100 is an image color appearance model (iCAM). FIG. 18 is a functional block diagram which highlights measurements and color metrics associated with an exemplary iCAM. The relative reflectance and instrumental gloss measurands drive the existing parameters of the iCAM, which initially derive from the camera device-dependent color space. Existing literature methods (including multiple linear regression) are used for characterizing the image sensor to enable inference of spatial spectral reflectance and colorimetric data (especially delta-E* with respect to a reference). By applying iCAM methods, an inferred spatial spectral reflectance can be extracted from integrated spectral data when weighted with the derived spatial parameters of the camera image and known spectral components from the relative reflectance measurement across multiple apertures; or with derived gloss characteristics from the known instrumental gloss measurement. Extensions of iCAM or other sample information may also or alternatively be output. An instrument 100 may provide edge-detection contrast. Edge-detection that is implicit in the spatial derivatives of L*, a*, b* is another extension of iCAM (spatial localization) that would allow the instrument user to analyze local color variations in their sample based on user-defined thresholds for $\nabla L^*$, $\nabla a^*$, $\nabla b^*$. The unification of all three subsystems enables a constant color difference of the sample. Constant color difference $\Delta E^*$ can be realized by mathematical formulation of the viewing conditions between instruments. In this framework, the color difference equation is optimized in a color appearance space. An image color appearance model can, among other functions, compare color differences measured with different viewing conditions. For example, any change in the spectral power distribution of the illumination between instruments will yield a colorimetric shift that must be accounted to achieve a constant color difference $\Delta E^*$.

Image color appearance models that account for changes in viewing conditions can adapt the color of the illumination (white point), the illumination level (luminance), and surrounding relative luminance of the instrument. Also known as adaptive gain control, these physiological mechanisms turn down the gain when the stimulus amplitude is high and by turning up the gain when the stimulus amplitude is low. This advanced colorimetric tool divides the viewing field of the human observer into multiple concentric apertures with annuli about a stimulus, as viewed from a standard distance of 130 mm or approximately 5.1" away.

The stimulus of interest is taken to be an area-averaged patch of 2° angular subtense (Ø0.1"@ 5.1" viewing distance) according to the CIE 1931 standard observer. Larger stimuli use the CIE 1964 supplementary standard for a 10° angular subtense (Ø0.9" @ 5.1" viewing distance). Some examples of the concentric rings about the stimulus include: a proximal field (if defined), a background, and a surround. The proximal field is the immediately adjacent environment of the stimulus, extending 2° from the edge of the stimulus. This region may be used to model local contrast effects, if useful. The background is defined as the greater environment around the stimulus, extending 10° from the edge of the stimulus or proximal field. Background is used to model simultaneous contrast. Lastly, the surround is the outside area beyond the sample, but still within the field of view of the imaging system.

An exemplary framework of image color appearance models is described by Fairchild (M. D. Fairchild and G. M. Johnson, "The iCAM framework for image appearance, image differences, and image quality," *Journal of Electronic Imaging*, 13 126-138 (2004)). To explain the method, it is helpful to further define the convolution operator for an imaging system. Convolution is a technique that describes the observation through a limiting aperture or kernel filter (i.e., receptive field). The actual mathematics of convolution are given in the following sequence:

Reverse the kernel
Shift the kernel through the image
Multiply and integrate the kernel with the image The result of convolution is a "blurred" version of the original image. The process may also be described as a simple multiplication of a low-pass filter in the frequency domain, following a Fourier Transform of the image.

Salient features of the Fairchild implementation include: light adaptation, chromatic or spectral adaptation, spatial frequency adaptation, and spatial localization. Light adaptation corresponds to a decrease in visual sensitivity upon an increase in the overall level of illumination. Chromatic adaptation includes adapting the white point by a weighted combination of the color of the light source and background to reduce changes relative to the spectral power distribution (SPD). Spatial frequency adaptation refines the contrast sensitivity function equations of the human visual response to appropriately blur high frequency content, and spatial localization improves the contrast of edges.

The input to iCAM is pixel image data in absolute luminance units, in addition to the relative CIE XYZ values per pixel. The adapting stimulus is a low-pass filtered CIE XYZ image that includes absolute luminance profiles for modeling chromatic adaptation. The absolute luminance Y pixels are used as a second low-pass image that describe the several dependent aspects of the model, such as the Hunt effect (increased image color with luminance) and the Stevens effect (increased image contrast with luminance). A third low-pass filter of luminance Y is applied for the image contrast that is a function of the relative luminance of the surround (Bartleson and Breneman equations). The output of the model includes a low-pass image, correlates of appearance (brightness, lightness, colorfulness, chroma, hue, saturation) and color difference. Images are reconstructed to create a color appearance map that encodes the apparent color of each pixel in the image for its viewing conditions. Difference metrics in these appearance dimensions can be used to derive metrics including delta E* and nabla E*.

Figure 19:
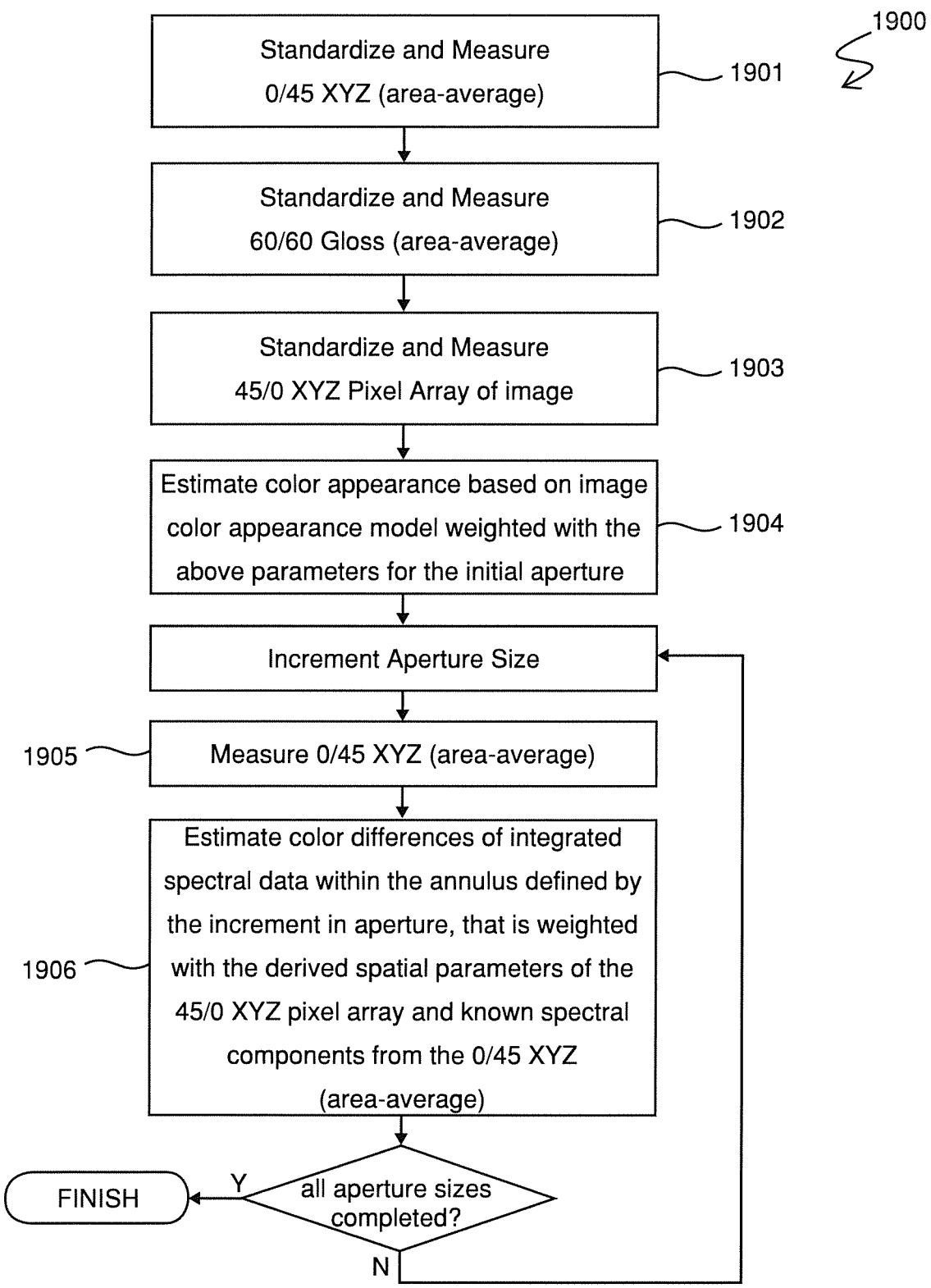
FIG. 19 is an exemplary self-consistent method performable with the spectroscopy instrument shown in FIGS. 1-13.

FIG. 19 is an exemplary method 1900 of self-consistent method performable with an instrument 100, for example. Generally, processes for producing a self-consistent iCAM may entail first measuring relative reflectance and gloss, and then processing a camera's captured image in dependence on the reflectance and gloss measurements.

For samples of non-uniform spatial color that are less than 2" in diameter, and that have a stimulus of interest less than or equal to 0.9" in diameter, as viewed from 5.1" distance, a self-consistent measurement can be taken following a standardization to the top-of-scale of each subsystem (e.g. black glass for gloss factor and white diffuser for reflectance factor/white balance of imaging luminance factor). For the initial stimulus aperture, Standardize and Measure 0/45 XYZ (area-average) (block 1901)

Standardize and Measure 60/60 gloss (area-average) (block 1902)

Standardize and Measure 45/0 XYZ pixel array of image (block 1903)

Estimate color appearance based on image color appearance model weighted with the above parameters for the initial aperture (1904)

Then, for each incremental aperture (within a predetermined aperture range, there being for example at least 2, at least 10, or at least 20 increments each of which may be equal in size or some of which may differ in size from one another), Measure 0/45 XYZ (area-average) (block 1905)

Estimate color differences of integrated spectral data within the annulus defined by the increment in aperture, that is weighted with the derived spatial parameters of the 45/0 XYZ pixel array and known spectral components from the 0/45 XYZ (area-average) (block 1906)

Figure 20:
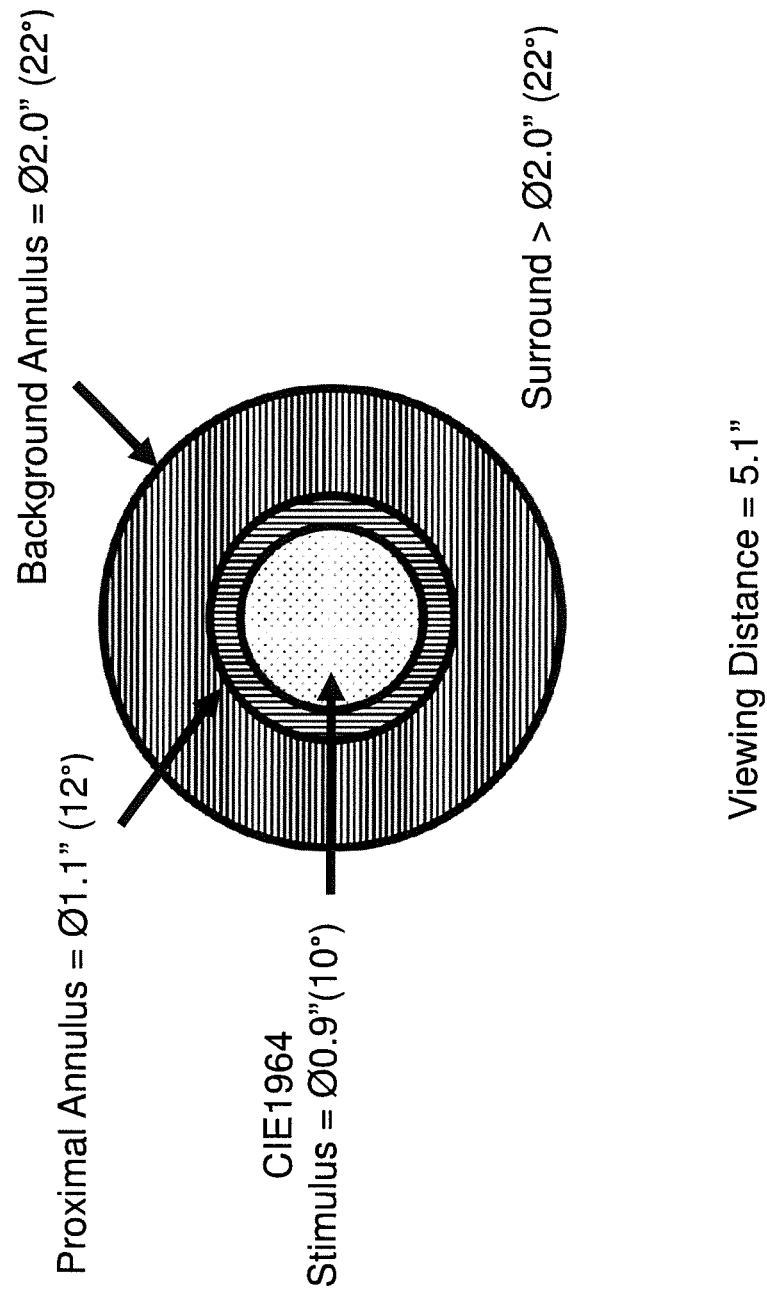
FIG. 20 is a diagram of variable apertures of the spectroscopy instrument at a 130 mm (5.1 in) viewing distance.

These steps may be done automatically in rapid succession from 0.1" to 2" with a motorized iris for example on the sample aperture. Multiple sample apertures are needed to characterize the proximal, background, and surround conditions for iCAM. FIG. 20 shows the range of aperture values corresponding to each field. Statistics such as describing the mean error may be used to optimize color differences extracted from the iCAM and relative reflectance/gloss.

FIG. 20 illustrates variable sample apertures that may be used for an exemplary instrument 100. A distinction can be drawn between a diameter of interest (of a sample) and background area to the sample of interest. Background area may be interchangeably referred to as proximal area. For iCAM to be meaningful, analysis of the background content is generally needed in addition to analysis of the sample diameter of interest. The "sample aperture" for a measurement depends on the setting of the variable field stop (e.g., field stop 1215, see FIGS. 12 and 13) and the port size of whichever sample port plate (e.g., sample port plate 104, see FIG. 1) is arranged at the sample port plate receiver (e.g., sample port plate receiver 211, see FIGS. 2A and 2B). The three optical subsystems discussed above (gloss-measuring, reflectance-measuring, and imaging) all share the same sample aperture for at least the small diameters (0.1"-0.5"). Relative reflectance and camera/imaging subsystems also use larger sample apertures of sizes up to the instrument's maximum sample aperture size, which in the illustrated exemplary embodiment is 2".

FIG. 21 is a diagram which generally conveys the relationship of physical components and physical aspects of an exemplary instrument 100 with respect to what is measured or taken: instrumental gloss, relative reflectance, or an image. FIG. 21 includes a number of features discussed above but is not intended to be exhaustive (i.e., it does not necessarily identify every possible feature or aspect of overlap of the subsystems). While some components are identifiable with just one of the particular subsystems, a significant number of components and features correspond with two or three subsystems. This high level of integration permits the advantages discussed elsewhere in this disclosure, in particular the ability to produce a self-consistent iCAM for any sample from a single unitary tabletop device.

The instrument 100 is configured to be compliant with standards which are generally required in industry for gloss measurements and reflectance measurements, for example. In some embodiments, the instrument is compliant with ASTM D523 for gloss. In some embodiments, the instrument is fully compliant or partially compliant with CIE 15:2004 and ASTM E1164 for relative reflectance. Both CIE 15:2004 and ASTM E1164 are herein incorporated by reference. For instance, the fiber-optic array may have collimating elements such as plano-convex lenses or off-axis parabolic mirrors, or the fibers may be replaced with annular 45a ring-shaped beam forming axicon lenses or other free-form optics, to fully comply with CIE 15:2004 and ASTM E1164. Alternatively, these particular features may be omitted with all other requirements of CIE 15:2004 and ASTM E1164 still being met. In some embodiments, the instrument is compliant with ISO 17321 for the image sensor. ISO 17321 is incorporated herein by reference.

The instrument may be configured such that ambient conditions such as temperature, humidity, and various forms of environmental noise are similarly if not identically regulated for all three subsystems. The unitary construction is at least partly responsible for this feature; the common housing for all three subsystems encourages consistent regulation of conditions for all of the instrument's internal components. Internal components which may affect ambient conditions, such as the LED array of the illumination assembly which may be capable of generating significant amounts of heat, are regulated by local regulatory means such as heat sinks.

Some embodiments may comprise performing or hardware configured to perform one or more adaptive measurement processes. For example, the signal of each measurement in real time may be considered, and a determination made of whether the sample presented is a fluorescent or similar high brightness sample. If it is determined to be such a sample, by evaluating the signal characteristics against pre-determined criteria, the measurement mode is adjusted and the measurement is automatically taken in that mode before presenting the measurement result.

Figure 22:
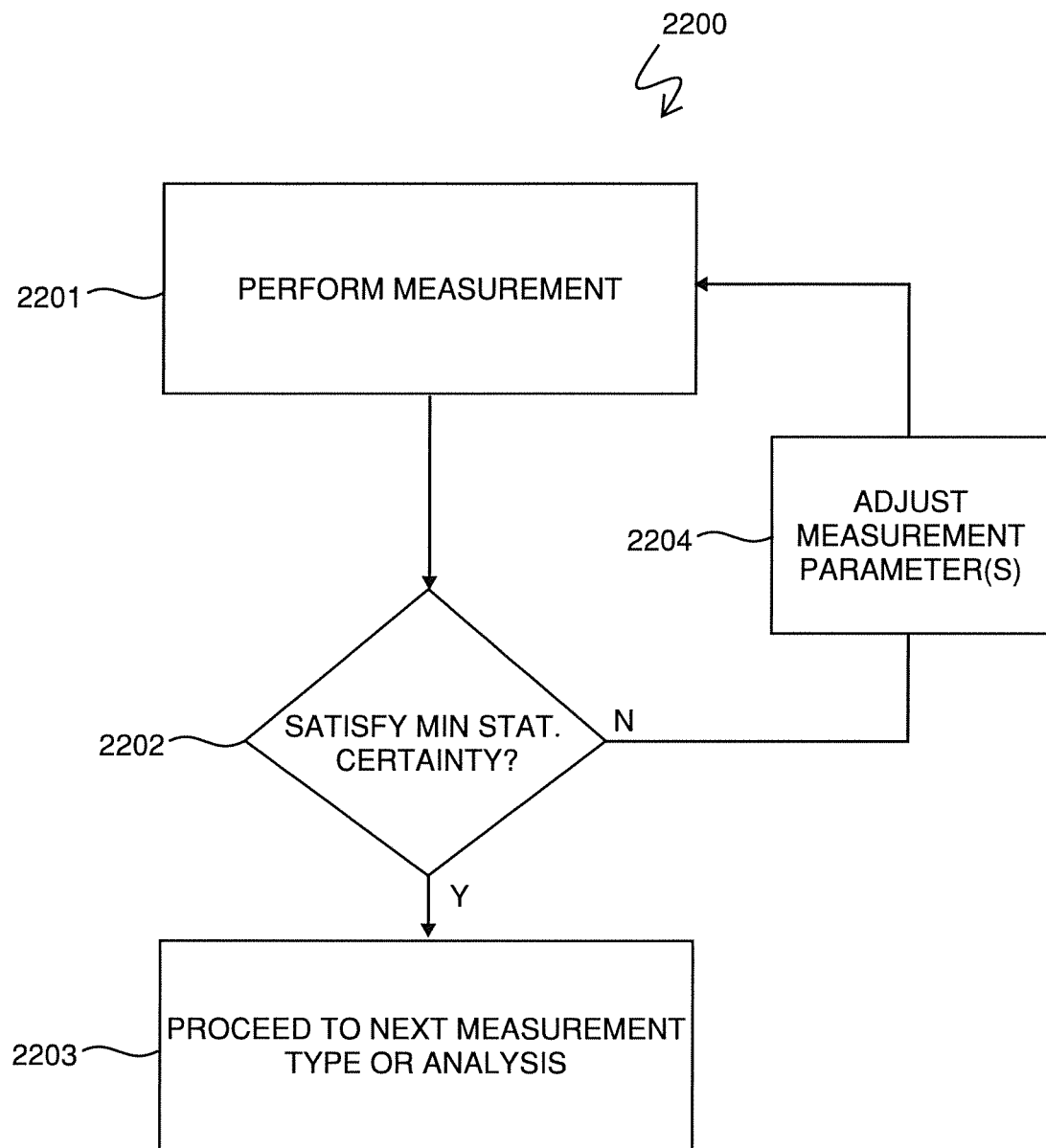
FIG. 22 is a flowchart for an exemplary adaptive measurement process.

FIG. 22 is a flowchart for an exemplary adaptive measurement process 2200. The process 2200 may be employed in connection with a measurement by one, some, or all of the subsystems discussed above. An advantage of process 2200 is the automatic adjustment of repeat sample measurements, the total number of measurement cycles (and parameters of those repeat measurements) being adapted for the characteristics of a particular sample. For a single measurand (be it relative reflectance, instrument gloss, image, or some other measurand), the measurement may need to be repeated a plurality of times to reach a predetermined statistical certainty (e.g., to comply with certain industry standards). As a generality, lighter or more opaque samples require fewer repeat measurements, while darker or more transparent samples require a greater number of repeat measurements. For example, two common calibration samples are a white tile and a black tile. The white tile has a great deal of reflectance and can generate a large amount of data with a high degree of statistical certainty of its accuracy on just one or a few measurement cycles. By contrast, a black tile has very little reflectance and thus the collected data from a single measurement cycle has considerably less certainty. An exemplary instrument 100 may be configured (e.g., programmed by software and/or firmware in the controller) to perform process 2200 in order to automatically and adaptively make a required number of repeat measurements for each measurand. The exact number of repeat measurements may vary from one sample to another. A measurement is taken for a particular measurand at block 2201. This measurement may be any of the measurements already discussed above in connection with the various subsystems of instrument 100. The controller then checks whether the results of the measurement (or measurements, if more than one cycle has already been performed) satisfy a minimum predetermined statistical certainty. If no, the measurement at block 2201 is repeated. If yes, then the controller may conclude its iterative measurement for the specific measurand in question and proceed to the next measurand and/or proceed with further analysis of the data which has been collected.

In some instances, prior to repeating a measurement, one or more measurement parameters may be adjusted by the controller at block 2204. For example, the lighting conditions of whichever subsystem is being used may be varied depending on the properties of the specific sample in question. Block 2204 serves to improve the results of individual measurements (block 2201), while the recursive or repetitive nature of the loop in process 2200 ensures an adequate total number of samples for satisfying overall statistical certainty for the measurand in question.

An exemplary instrument 100 may collect a measure for each of instrumental gloss, relative reflectance, and an image for a sample relatively quickly (e.g., in approximately 25 ms or less). Despite the speed of a single cycle, an unnecessarily large number of cycles reduces overall efficiency of the instrument. If a user must manually make a decision as to how many measurement cycles are performed for a given sample, this is not only an inconvenience to a user but also introduces problems of time delay to allow human computation and the possibility of human error. The automated and adaptive process 2200 eliminates these concerns and maximizes the efficiency of producing an iCAM for any sample regardless of the sample's unique aspects as compared to other samples.

Some embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Some aspects of some embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

While one or more exemplary embodiments of the present invention have been disclosed herein, one skilled in the art will recognize that various changes and modifications may be made, including combinations of just some of the elements or features disclosed herein with or without additional elements, without departing from the scope of the invention as defined by the following claims.

REFERENCE LIST 100 instrument
101 user interface
102 sample clamp
103 housing
104 sample port plate
201 sample clamp receiver
202 aperture
203 main instrument control board
204 I/O and power board
205 power switch
211 sample port plate receiver
212 sample port plate detectors
301 ring assembly
302 fiber-optic detection array
303 fiber-optic illumination array
305 gloss measurement emitter block
306 gloss measurement receiver block
310 fiber bundle (from monitor channel)
311 fiber bundle (from fiber-optic detection array)
312 fiber bundle (to fiber-optic illumination array)
404 spectrometer
414 illumination assembly
603 single board computer (SBC)
612 stepper motor
701 small area-of-view (SAV) illumination lens group
702 large area-of-view (LAV) illumination lens group
705 motorized lens platter
706 optical encoder
707 curved gear rack
708 telecentric lens assembly
712 optical limit switch
811 digital camera assembly
813 fiber illumination coupler
1101 monitor channel
1211 printed circuit board (PCB)
1212 LED array
1213 light pipe
1214 beamsplitter
1215 (variable) field stop 1216 motorized gear
1217 illumination focusing lens
1218 sample channel iris
1220 heat sink

We claim:
1. A spectroscopy instrument, comprising:
in a unitary construction,
   a specular gloss-measuring subsystem configured to measure specular gloss;
   a reflectance factor-measuring subsystem configured to measure relative reflectance factor; and
   an imaging subsystem configured to capture one or more color appearance images.

2. The spectroscopy instrument of claim 1, further comprising a controller configured to generate a self-consistent image color appearance models (iCAMs) from measurements of the specular gloss-measuring subsystem, reflectance factor-measuring subsystem, and imaging subsystem.

3. The spectroscopy instrument of claim 1, further comprising a sample aperture shared by the specular gloss-measuring subsystem, the reflectance factor-measuring subsystem, and the imaging subsystem.

4. The spectroscopy instrument of claim 3, wherein the reflectance factor-measuring subsystem and imaging system share reciprocal 0/45 and 45/0 geometries of the sample aperture.

5. The spectroscopy instrument of claim 4, wherein an illumination axis of the reflectance factor-measuring subsystem is coaxial with a measurement axis of the imaging subsystem.

6. The spectroscopy instrument of claim 3, wherein the sample aperture is variable from 0.1" to 2" through a combination of a variable field-stop for illumination and a variable port plate for collection.

7. The spectroscopy instrument of claim 1, further comprising a controller for controlling activation of the subsystems, one or more ultraviolet (UV) light sources of one or more of the subsystems, and one or more sample presence sensors for detecting the presence or absence of a sample, wherein the controller is configured to permit activation of the one or more UV light sources only when the presence of a sample is detected by the one or more sample presence sensors.

8. The spectroscopy instrument of claim 1, further comprising a ring assembly with
   a fiber-optic detection array of the reflectance factor-measuring subsystem, and
   a fiber-optic illumination array of the imaging subsystem that is coupled to an illumination assembly shared by the reflectance factor-measuring subsystem,
   wherein the ring assembly enables self-consistent viewing conditions in terms of geometry and spectral power distribution.

9. The spectroscopy instrument of claim 1, wherein the specular gloss-measuring subsystem comprises an emitter block and a receiver block with 20/20, 60/60, 85/85, or 30/30 geometry.

10. The spectroscopy instrument of claim 1, wherein the specular gloss-measuring subsystem is ASTM D523 compliant.

11. The spectroscopy instrument of claim 1, wherein the reflectance factor-measuring subsystem comprises an illumination assembly, a fiber-optic detection array, and a spectrometer.

12. The spectroscopy instrument of claim 11, wherein the illumination assembly comprises an LED array and a color mixing light pipe for homogenizing different outputs of different LEDs of the LED array.

13. The spectroscopy instrument of claim 12, further comprising a controller for controlling activation of the subsystems, wherein the controller has discrete control over each LED of the LED array and permits compensation for differences in a detector spectral response of the subsystems by using pulse width modulation.

14. The spectroscopy instrument of claim 12, wherein the LED array comprises one or more of electroluminescent narrow-band full width half maximum (FWHM) LEDs, electroluminescent LEDs and laser diodes combined with broadband photoluminescent YAG phosphors, and quantum dots.

15. The spectroscopy instrument of claim 11, wherein the reflectance factor-measuring subsystem further comprises a plurality of lens groups.

16. The spectroscopy instrument of claim 15, wherein the reflectance factor-measuring subsystem further comprises a motorized stage for changing which of the plurality of lens groups is aligned with a 0° axis of the reflectance factor-measuring subsystem.

17. The spectroscopy instrument of claim 16, wherein the imaging subsystem comprises a camera affixed to the motorized stage, the motorized stage being movable to bring the camera into and out of alignment with the 0° axis.

18. The spectroscopy instrument of claim 17, wherein the imaging subsystem further comprises a circumferential fiber-optic illumination array coupled to the same illumination assembly of the reflectance factor-measuring subsystem, wherein the camera has a 45/0 geometry with the circumferential fiber-optic illumination array when the camera is in alignment with the 0° axis.

19. The spectroscopy instrument of claim 1, wherein the reflectance factor-measuring subsystem is CIE 15:2004 and ASTM E1164 compliant.

20. The spectroscopy instrument of claim 1, wherein the imaging subsystem is ISO 17321 compliant.

21. The spectroscopy instrument of claim 1, further comprising a controller configured to generate a self-consistent image color appearance model (iCAM) from measurements of the specular gloss-measuring subsystem, reflectance factor-measuring subsystem, and imaging subsystem, wherein the controller is configured to
   process an image from the imaging subsystem in dependence on the relative reflectance factor and specular gloss measurements, and
   output a self-consistent iCAM at an output terminal.

22. The spectroscopy instrument of claim 21, wherein the output terminal is a user interface shared by the specular gloss-measuring subsystem, the reflectance factor-measuring subsystem, and the imaging subsystem.

23. The spectroscopy instrument of claim 1, further comprising a controller configured to generate a self-consistent image color appearance model (iCAM) from measurements of the specular gloss-measuring subsystem, reflectance factor-measuring subsystem, and imaging subsystem, wherein the controller is configured for
   initial mapping of the relative reflectance factor to RAW/linear pixels values of the image sensor, separating the spatial characteristics of the two-dimensional imagery within a local color difference metric,
   characterizing spatial content in terms of gradients of the color difference metrics, and
   measuring the influence of specular gloss on object appearance.

24. The spectroscopy instrument of claim 1, wherein for at least one the subsystems, after each measurement the controller is configured to
- determine whether the measurement and any preceding cycles of the same measurement satisfy a predetermined minimum statistical certainty,
- direct the subsystem to repeat the measurement if the predetermined minimum statistical certainty is not satisfied, and
- conclude measurement with the subsystem if the predetermined minimum statistical certain is satisfied.

25. The spectroscopy instrument of claim 24, wherein when the determining step finds the predetermined minimum statistical certainty is not met by the measurement, the controller is configured to adjust one or more measurement parameters prior to repeating the measurement.

* * * * *